(12) United States Patent
Han et al.

(10) Patent No.: US 10,095,264 B2
(45) Date of Patent: Oct. 9, 2018

(54) SOUND SYSTEM AND DISPLAY DEVICE COMPRISING IT

(71) Applicant: LG ELECTRONICS INC., Seoul (KR)

(72) Inventors: Seokbong Han, Seoul (KR); Hyunjung Kang, Seoul (KR); Munhwan Kim, Seoul (KR); Kyoungjun Lee, Seoul (KR); Chunsoo Chang, Seoul (KR); Dongwoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/621,064

(22) Filed: Jun. 13, 2017

(65) Prior Publication Data

US 2018/0024588 A1 Jan. 25, 2018

Related U.S. Application Data

(60) Provisional application No. 62/366,103, filed on Jul. 24, 2016.

(30) Foreign Application Priority Data

Aug. 24, 2016 (KR) .......................... 10-2016-0107576

(51) Int. Cl.
*H04R 1/02* (2006.01)
*G06F 1/16* (2006.01)
*H04R 5/02* (2006.01)

(52) U.S. Cl.
CPC ........... *G06F 1/1605* (2013.01); *H04R 1/025* (2013.01); *H04R 1/028* (2013.01); *H04R 5/02* (2013.01);

(Continued)

(58) Field of Classification Search
CPC ...... H04R 5/04; H04R 2499/11; H04R 27/00; H04R 1/10; H04R 5/02; H04R 5/027; H04R 1/026; H04R 2499/13; H04R 1/1008; H04R 1/1041; H04R 1/323; H04R 1/406; H04R 2201/025; H04R 2205/022;

(Continued)

(56) References Cited

U.S. PATENT DOCUMENTS 4,884,646 A 12/1989 Zambias
8,072,748 B2 * 12/2011 Baller .................. G06F 1/1688
248/118

(Continued)

FOREIGN PATENT DOCUMENTS

CN 105657302 A 6/2016
DE 19737058 C1 4/1999
EP 3177035 A1 6/2017

OTHER PUBLICATIONS

Slideme, "iDisplay," http://slideme.org/application/idisplay, Dec. 27, 2012, 2 pages, XP055430791.

*Primary Examiner* — Lun-See Lao
(74) *Attorney, Agent, or Firm* — Birch, Stewart, Kolasch & Birch, LLP

(57) ABSTRACT

A display device is disclosed. The display device comprising: a display unit including a display panel providing an image; a housing being apart from the display unit and including an electrical unit; and a cable electrically connected with the display panel and the electrical unit, wherein the electrical unit provides the display panel with a signal and/or power.

19 Claims, 28 Drawing Sheets

(52) U.S. Cl.
CPC .... *H04R 2201/025* (2013.01); *H04R 2499/15* (2013.01)

(58) Field of Classification Search
CPC ............ H04R 2420/07; H04M 1/6033; H04M 1/605; H04M 1/6066; H04M 1/72522; H04M 1/72527; H04M 1/72552; H04M 1/72572; H04M 2250/10; H04M 2250/12; H04M 1/0245; H04M 1/04; H04B 1/385; H04B 2001/3866; H04W 4/008; H04W 4/04
USPC ........ 381/333, 306, 388, 303, 307; 181/175, 181/198, 199; 345/158, 169
See application file for complete search history.

(56) References Cited

U.S. PATENT DOCUMENTS

| | | | |
|---|---|---|---|
| 8,144,901 B2* | 3/2012 | Tsuiki .................... | H04R 1/026 381/306 |
| 9,331,417 B2* | 5/2016 | Lee ........................ | G06F 1/1656 |
| 2006/0291149 A1* | 12/2006 | Suzuki .................... | H04N 5/64 361/679.21 |
| 2010/0296686 A1 | 11/2010 | Machii et al. | |
| 2014/0341418 A1 | 11/2014 | Kwong et al. | |
| 2015/0340795 A1 | 11/2015 | Lee et al. | |

\* cited by examiner

SOUND SYSTEM AND DISPLAY DEVICE COMPRISING IT

This application claims the benefit of U.S. Provisional Patent Application No. 62/366,103 filed on Jul. 24, 2016 and Korean Patent Application No. 10-2016-0107576 filed on Aug. 24, 2016, the entire contents of which are incorporated herein by reference for all purposes as if fully set forth herein.

BACKGROUND OF THE INVENTION

Field of the Invention

The present invention relates to a sound system. More particularly, the present invention relates to a sound system operatively associated with a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

The OLED panel can display an image by depositing an organic layer capable of emitting light on a substrate on which a transparent electrode is formed. OLED panels are not only thin but also have flexible characteristics. Research has been conducted on the structural characteristics of a display device having such an OLED panel.

In recent years, in order to realize various designs of display devices, a sound system or an image control system, which can be provided in a display device, tends to be separated from a display panel, and studies are actively conducted.

SUMMARY OF THE INVENTION

Accordingly, an object of the present disclosure is to address the above-described and other problems.

Another object of the present disclosure is to provide a sound system movable in conjunction with driving of a display panel.

In one aspect, there is provided a display device comprising: a display unit including a display panel providing an image; a housing being apart from the display unit and including an electrical unit; and a cable electrically connected with the display panel and the electrical unit, wherein the electrical unit provides the display panel with a signal and/or power.

According to at least one embodiment of the present invention, a sound system movable in conjunction with driving of a display panel is provided.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
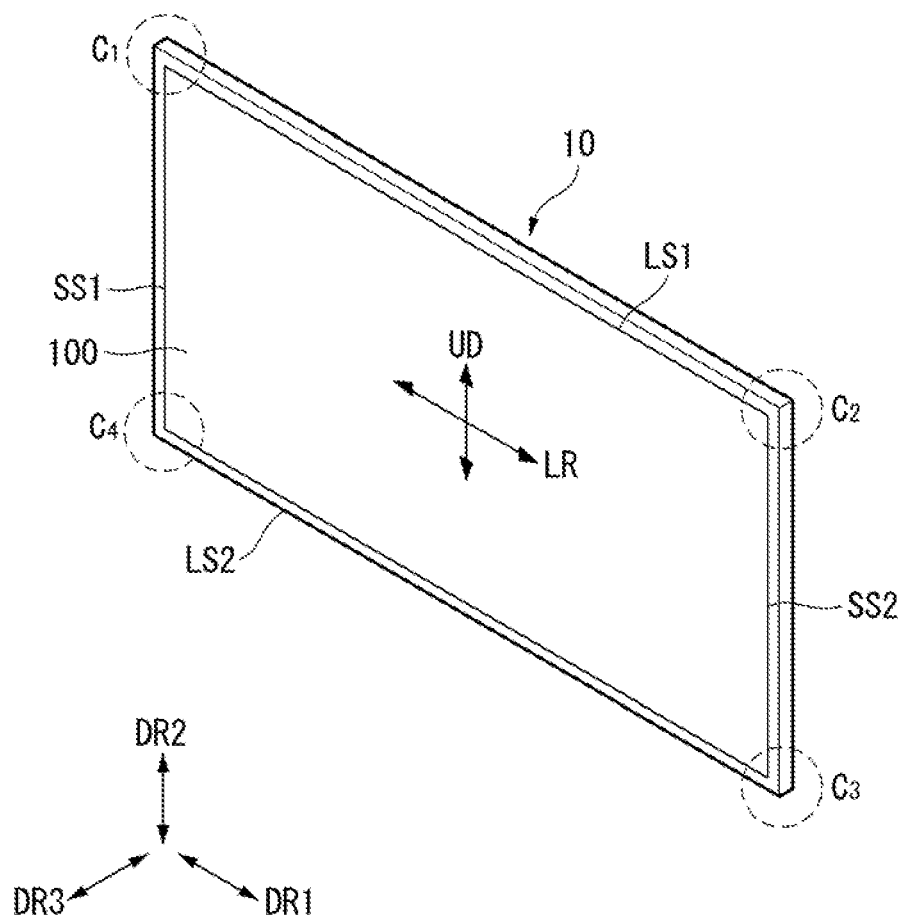
FIGS. 1 to 5 are views showing examples of display devices related to the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, an organic light emitting diode (OLED) will be described as an example of the display panel. However, the display panel applicable to the present invention is not limited to the OLED panel. A plasma display panel (PDP), a field emission display (FED), and a liquid crystal display (LCD) are applicable to the present invention.

Referring FIG. 1, the display device may include a first long side LS1 and a second long side LS2 opposite to a first long side LS1. The display device may include a first short side SS1 and a second short side SS2. The first short side SS1 may be adjacent to an end of the first long side LS1 and may be adjacent to an end of the second side LS2. The second short side SS2 may be opposite to the first short side SS1.

An area of the first short side SS1 may be referred to as a first side area and an area of the second short side SS2 may be referred to as a second side area opposite to the first side area. An area of the first long side LS1 may be referred to as a third side area. The third side area may be adjacent to the first side area and the second side area and located between the first side area and the second side area. An area of the second long side area LS2 may be referred to as a fourth side area. The fourth side area may be located between the first side area and the second side area and may be opposed to the third side area.

The lengths of the first and second long sides LS1 and LS2 may be longer than the lengths of the first and second short sides SS1 and SS2. The lengths of the first and second long sides LS1 and LS2 may be substantially the same as the lengths of the first and second short sides SS1 and SS2.

In the following description, a first direction DR1 may be a direction parallel to long sides LS1, LS2 of a display device, a second direction DR2 is a direction parallel to short sides SS1, SS2.

The third direction DR3 may be a direction perpendicular to the first direction DR1 and/or the second direction DR2.

The first direction DR1 and the second direction DR2 may collectively be referred to as a horizontal direction. In addition, the third direction DR3 may be referred to as a vertical direction.

In another point of view, an orientation in which the head 10 of the display device displays an image may be referred to as a forward or a front side. When the head 10 of the display device displays an image, an orientation in which the image cannot be observed can be referred to as a rearward or a rear side. When looking at the head 10 of the display from the forward or the front side, the first long side LS1 side may be referred to as a upward or a upper side. Likewise, the second long side LS2 can be referred to as a downward or a lower side. Similarly, the first short side SS1 may be referred to as a leftward or a left side, and the second short side SS2 may be referred to as a rightward or a right side.

The first long side LS1, the second long side LS2, the first short side SS1 and the second short side SS2 may be referred to as an edge of the head 10 of the display device. The point where two sides among the first long side LS1, the second long side LS2, the first short side SS1, and the second short side SS2 meet with each other may be referred to as a corner.

For example, a point where the first long side LS1 and the first short side SS1 meet may be the first corner C1, a point where the first long side LS1 and the second short side SS2 meet may be the second corner C2, a point where the second short side SS2 and the second long side LS2 meet may be a third corner C3, and a point where the second long side LS2 and the first short side SS1 meet may be a fourth corner C4.

The direction from the first short side SS1 to the second short side SS2 or the direction from the second short side SS2 to the first short side SS1 can be referred to as the left and right direction LR. The direction from the first long side LS1 to the second long side LS2 or the direction from the second long side LS2 to the first long side LS1 may be the up and down direction UD.

Figure 2:
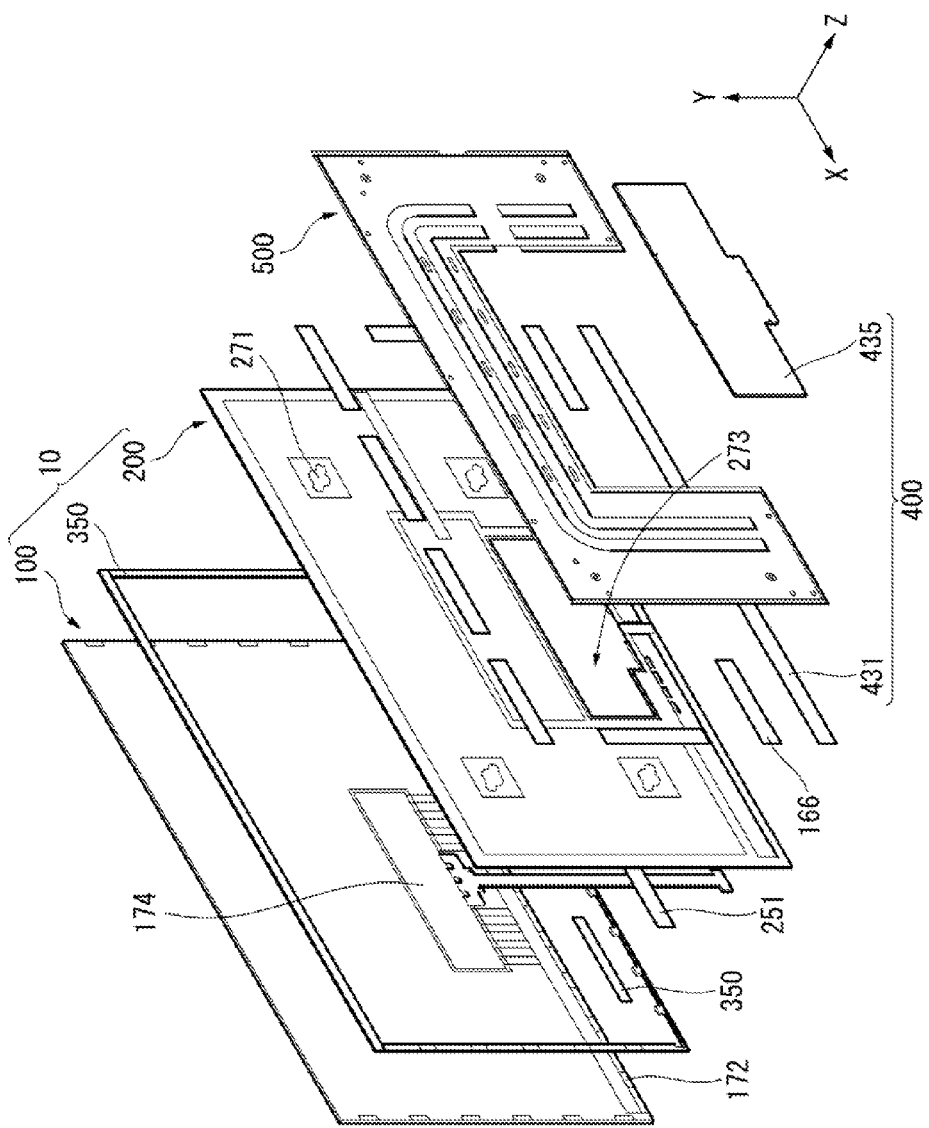

Referring to FIG. 2, the head 10 may include a display panel 100, a back cover 200, and a PCB cover 400. The head 10 may be referred to as a display unit 10.

The display panel 100 may provided on the front side of the head 10 and may display images. The display panel 100 may divide the image into a plurality of pixels and output an image according to the color, brightness, and saturation of each pixel.

The display panel 100 may be an organic light emitting diode (OLED) panel. The display panel 100 may be a liquid crystal display (LCD) panel.

The interface PCB 174 and the at least one source PCB 172 may be located on at least a portion of the backside of the display panel 100. The interface PCB 174 may be located above the at least one source PCB 172. At least one source PCB 172 may be coupled to the interface PCB 174. Each source PCB 172 may be spaced apart from one another. The FFC 157 may be located between the source PCB 172 and the interface PCB 174. The FFC 157 can electrically connect the source PCB 172 and the interface PCB 174.

The interface PCB 174 may be positioned with signal lines for transmitting digital video data and timing control signals transmitted from the timing controller board of the housing.

At least one source PCB 172 may apply a voltage to the display panel 100 in accordance with a signal transmitted from the interface PCB 174. That is, at least one source PCB 172 may apply a driving waveform to the display panel 100 according to a video signal. The source PCB 172 may be connected to the display panel 100 by a source COF (Chip On Film) 123. The source COF 123 connected to the source PCB 172 may extend to the lower surface of the display panel 100 and be connected to the display panel 100.

The source COF 123 may be electrically connected to the source PCB 172 and the data pads of the display panel 100. The source COF 123 can implement a data integrated circuit.

The adhesive sheet 350 may be positioned on the rear surface of the display panel 100 in order to couple the display panel 100 and the back cover 200 together. The adhesive sheet 350 may be in the form of a rectangular frame with an empty center. Since the center of the adhesive sheet 350 is empty, at least one PCB may be located in the empty space.

A surface of the adhesive sheet 350 may be bonded to the display panel 100. Another surface of the adhesive sheet 350 may be bonded to the back cover 200.

The insulating sheet 251 may be located in correspondence with the source PCB 172. The insulating sheet 251 may be attached to the front surface of the back cover 200. The insulating sheet 251 may include an insulating material such that the source PCB 172 is not interfered with by other electronic devices. For example, the PCB cover 400 may comprise a plastic material. Accordingly, the PCB cover 400 can protect the source PCB 172 from a leakage current.

The back cover 200 may be positioned on the rear surface of the display panel 100. The back cover 200 may be attached to the display panel 100 through the adhesive sheet 350. The back cover 200 can support the rear surface of the display panel 100. That is, the back cover 200 can reinforce the rigidity of the display panel 100. The back cover 200 may include a lightweight and high strength material. For example, the back cover 200 may comprise aluminum.

The back cover 200 may have a different thickness depending on the position. The back cover 200 may be formed. The thickness of the edge region of the back cover 200 may be greater than the thickness of the other portions of the back cover 200. Since the back cover 200 is formed, the rigidity of the back cover 200 can be improved.

The coupling hole 271 may be positioned at a portion adjacent to the four corners of the back cover 200. The coupling hole 271 may be a portion penetrating the back cover 200. The coupling hole 271 can help to join the wall bracket 500 and the head 10. The thickness in the vertical direction of the portion where the coupling hole 271 is located may be greater than the thickness in the other direction. Accordingly, the wall bracket 500 and the head 10 are adjacent to each other, so that the binding force can be strengthened.

The coupling portion 166 can be positioned at the edge of the back cover 200. The coupling portion 166 may be located on at least one side of the back cover 200. The coupling portion 166 may protrude from the back cover 200 rearward. Accordingly, the portion where the coupling portion 166 is located may be the same or similar in vertical height to the portion where the coupling hole 271 of the back cover 200 is located. The position of the coupling portion 166 is not limited and may be located at any portion of the back cover 200 if the thickness of the portion of the back cover 200 is thin.

The coupling portion 166 may include a magnetic material. The coupling portion 166 may contribute to engaging of the head 10 and the wall bracket 500 by using magnetism The back cover 200 may have an opening 273 at a portion corresponding to the interface PCB 174 when the back cover 200 is coupled. For example, the opening 273 may be located at the center of the back cover 200. The opening 273 can provide a space for the interface PCB 174 to be positioned between the display panel 100 and the back cover 200. If too much opening 273 is formed in the back cover 200, cracks may be formed in the back cover 200 or the rigidity may be weakened. Accordingly, it is preferable that the back cover 200 has a small opening 273.

A PCB cover 400 may be positioned at a rear of the PCB. The PCB cover 400 may include first and second PCB covers 431 and 435. The first PCB cover 431 may be positioned at a rear of the source PCB 172 and the second PCB cover 435 may be positioned at a rear of the interface PCB 174. That is, the second PCB cover 435 may cover the opening 273. The PCB cover 400 may prevent the source PCB 172 and the interface PCB 174 from being exposed to the outside. Accordingly, the PCB cover 400 may be opaque so that the source PCB 172 and the interface PCB 174 are not invisible to the outside.

The PCB cover 400 may include a material that is electrically insulative so that the source PCB 172 and the interface PCB 174 are not interfered with by other electronic devices. For example, the PCB cover 400 may comprise a plastic material. Accordingly, the PCB cover 400 can protect the source PCB 172 and the interface PCB 174 from leakage currents.

The display panel 100 can be supported by only the back cover 200. That is, the head 10 may not include the cover other than the back cover 200. Accordingly, the user can feel that the thickness of the head 10 is very thin, and can concentrate more on the display screen.

Figure 3:
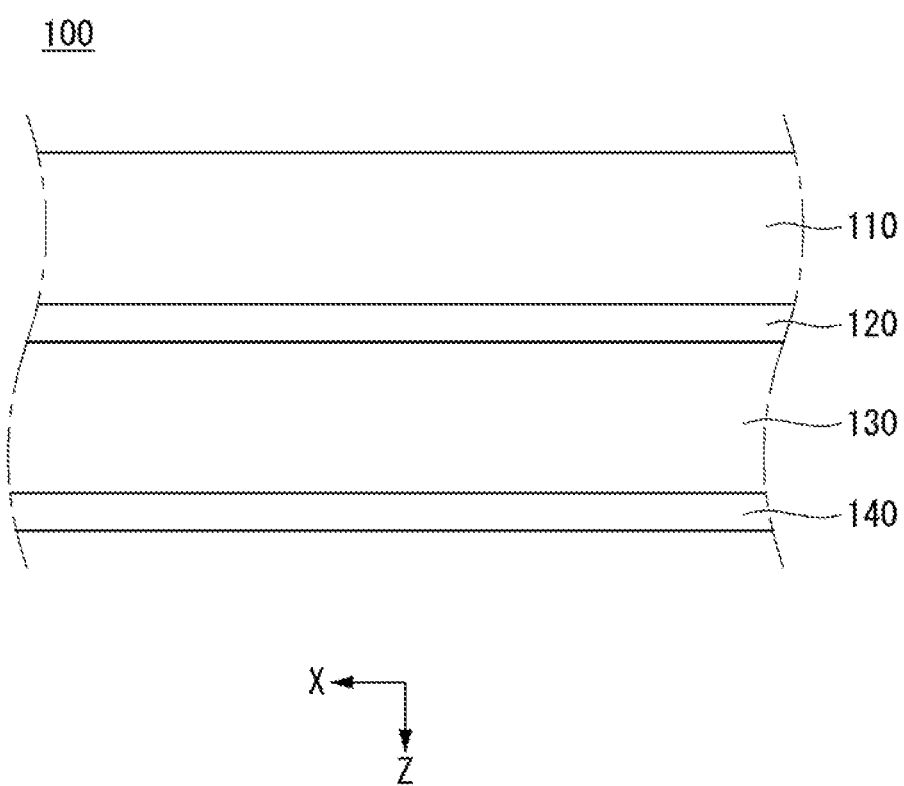

Referring to FIG. 3, the display panel 100 may include a transparent substrate 110, an upper electrode 120, an organic light emitting layer 130, and a lower electrode 140. The transparent substrate 110, the upper electrode 120, the organic light emitting layer 130, and the lower electrode 140 may be sequentially formed.

The transparent substrate 110 and the upper electrode 120 may include a transparent material. The lower electrode 140 may include a non-transparent material. The lower electrode 140 may include a transparent material (for example, ITO). In this case, light may be emitted to a surface of the lower electrode 140.

When a voltage is applied to the upper electrode 120 and lower electrode 140, light emitted from the organic light emitting layer 130 may be transmitted through the upper electrode 120 and the transparent substrate 110 to be emitted to the outside. At this time, a light shielding plate may be further formed behind the lower electrode 140 to emit the light emitted to the lower electrode 140 to the front surface.

Figure 4:
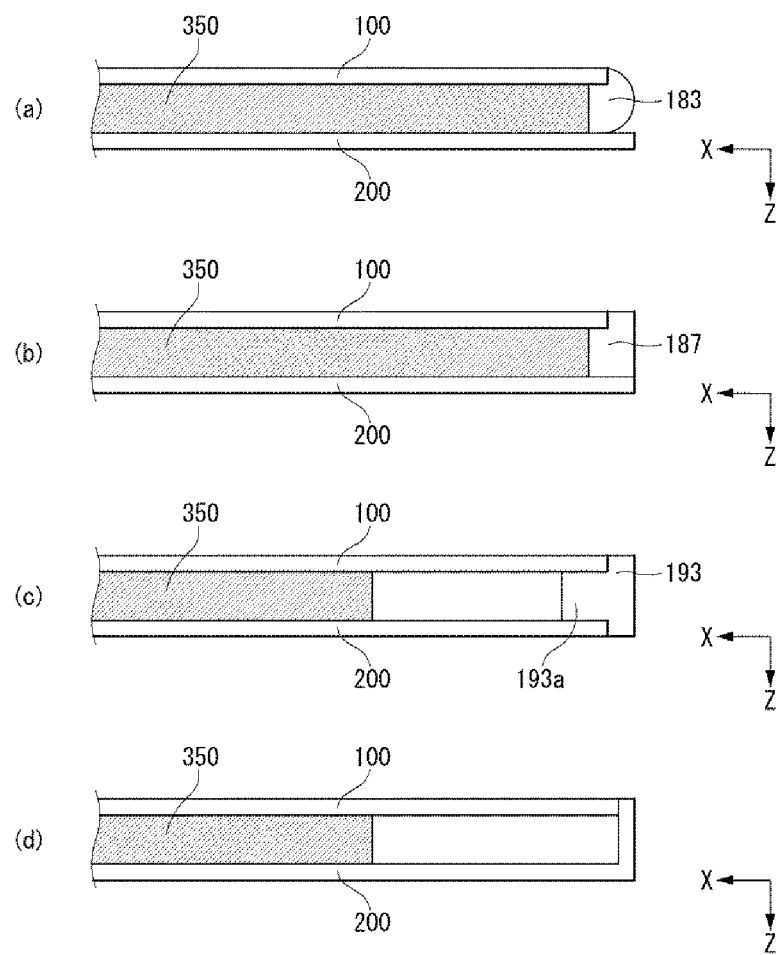

Referring to FIG. 4, the display panel 100 may be attached to the back cover 200 by an adhesive sheet 350. The adhesive sheet 350 may include a double-sided tape.

The adhesive sheet 350 may have a thickness. Accordingly, foreign substances or dust may enter between the display panel 100 and the back cover 200. In order to prevent this, as shown in FIG. 4 (a), the sealing member 183 can be side-sealed to at least a side of the adhesive sheet 350. The sealing member 183 can shield at least one side of the adhesive sheet 350 and the display panel 100 at the same time.

As another example, the frame 187 may be inserted into at least one side of the adhesive sheet 350, as shown in FIG. 4 (b). The frame 187 may contact at least one side of the adhesive sheet 350 and may be bent so that one end of the frame 187 extends toward the display panel 100. Accordingly, at least one side of the display panel 100 can be simultaneously shielded.

As another example, the middle cabinet 193 may be positioned between the display panel 100 and the back cover 200, as shown in FIG. 4 (c). The middle cabinet 193 can guide the position where the display panel 100 is coupled. The flange 193a of the middle cabinet 193 can be inserted between the display panel 100 and the back cover 200. The middle cabinet 193 can shield at least one side of the display panel 100 and the back cover 200 at the same time.

The flange 193a of the middle cabinet 193 may be spaced apart from the adhesive sheet 350. Accordingly, since the adhesive sheet 350 does not need to be entirely placed on the display panel 100, the amount of the adhesive sheet 350 for the display device can be reduced.

As another example, the edge portion of the back cover 200 may be bent toward the display panel 100, as shown in FIG. 4 (d). Since the edge portion of the back cover 200 is bent, at least one side of the adhesive sheet 350 can be shielded from the outside.

In this case, other materials may not be included between the display panel 100 and the back cover 200. Thus, the manufacturing process of the display device can be simplified, and the cost can be saved. Further, the edge of the back cover 200 can be separated from the adhesive sheet 350. Accordingly, since the adhesive sheet 350 does not need to be entirely placed on the display panel 100, the amount of the adhesive sheet 350 for the display device can be reduced.

Figure 5:
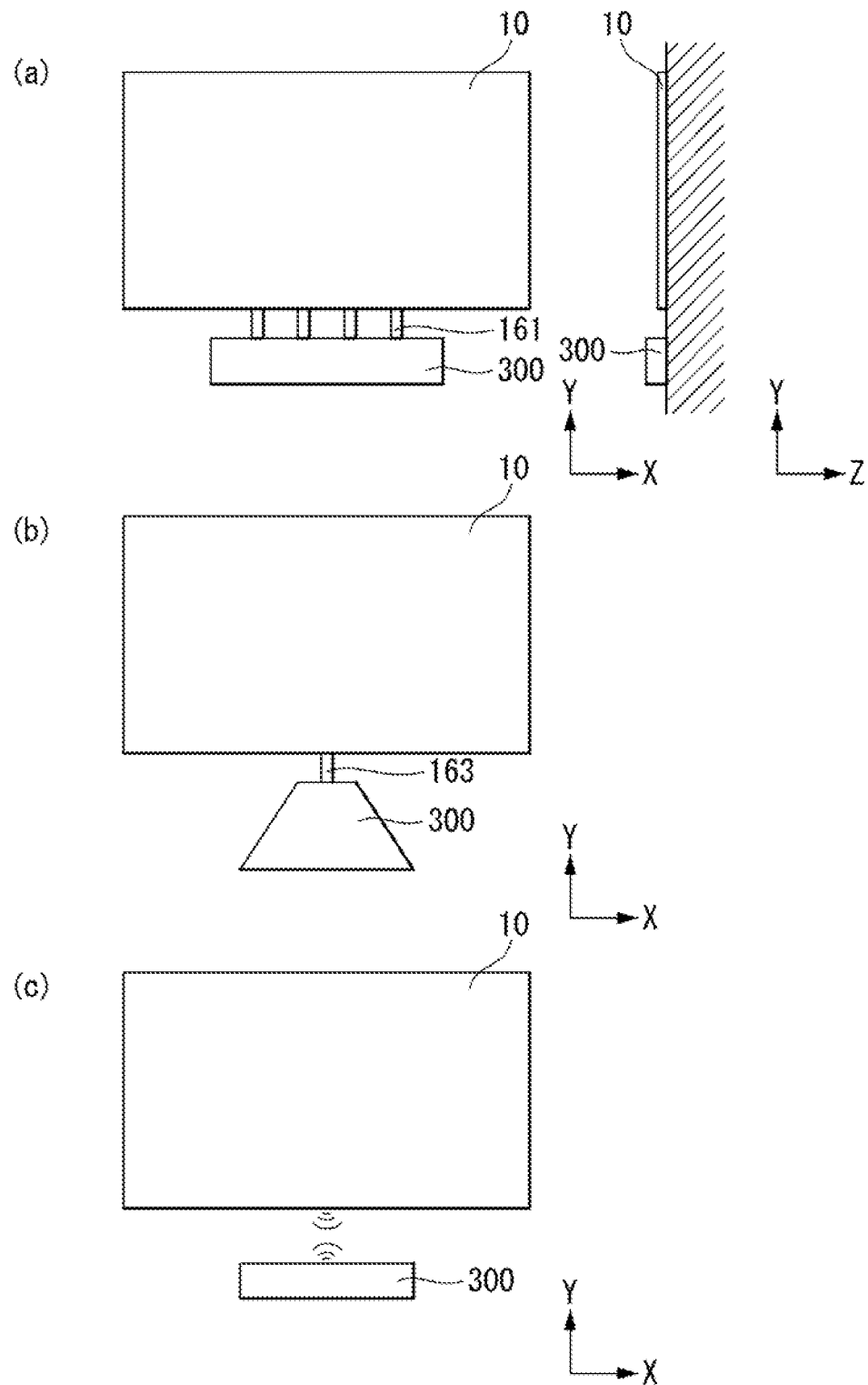

Referring to FIG. 5, the display device may include a housing 300 electrically connected to the head 10. The housing 300 may include electrical unit providing the head 10 or the display unit 10, in particular the display panel 110 (shown in FIG. 2) with a signal and/or power. For instance, the housing 300 electrically connected to the head 10 or the display unit 10 may mean the electrical unit electrically connected to the display panel 110 (shown in FIG. 2) or the head 10 or the display unit 10.

The housing 300 can transmit at least one signal to the head 10. The housing 300 may shield the components that drive the display device. For example, the housing 300 may shield at least one printed circuit board (PCB). The detailed coupling structure of the at least one printed circuit board and the method of coupling the at least one printed circuit board will be described later.

For example, as shown in FIG. 5A, the housing 300 may be connected to the head unit 10 through a plurality of flat cables 161 having a flat shape. The flat cable 161 may include a plurality of signal connection terminal pins and at least one ground terminal pin for connecting the housing 300 and the head unit 10. The flat cable 161 is advantageous in cost compared to other cables.

As another example, as shown in FIG. 5 (b), the housing 300 can be engaged with the head 10 through one circular cable 163. That is, a plurality of flat cables 161 in FIG. 3 (b), can be connected through a single circular cable 163 in FIG. 5(b). Since the housing 300 and the head unit 10 are connected through a single circular cable 163 rather than a plurality of circular cables 163, the user can feel that the appearance is cleaner.

As another example, as shown in FIG. 5 (c), the housing 300 and the head unit 10 can exchange electric signals wirelessly. In this case, the user may feel that the appearance is cleaner than when the housing 300 and the head part 10 are connected through the flat cable 161 or the circular cable 163.

The housing 300 may be described below as a sound system or control system or control unit.

Figure 6:
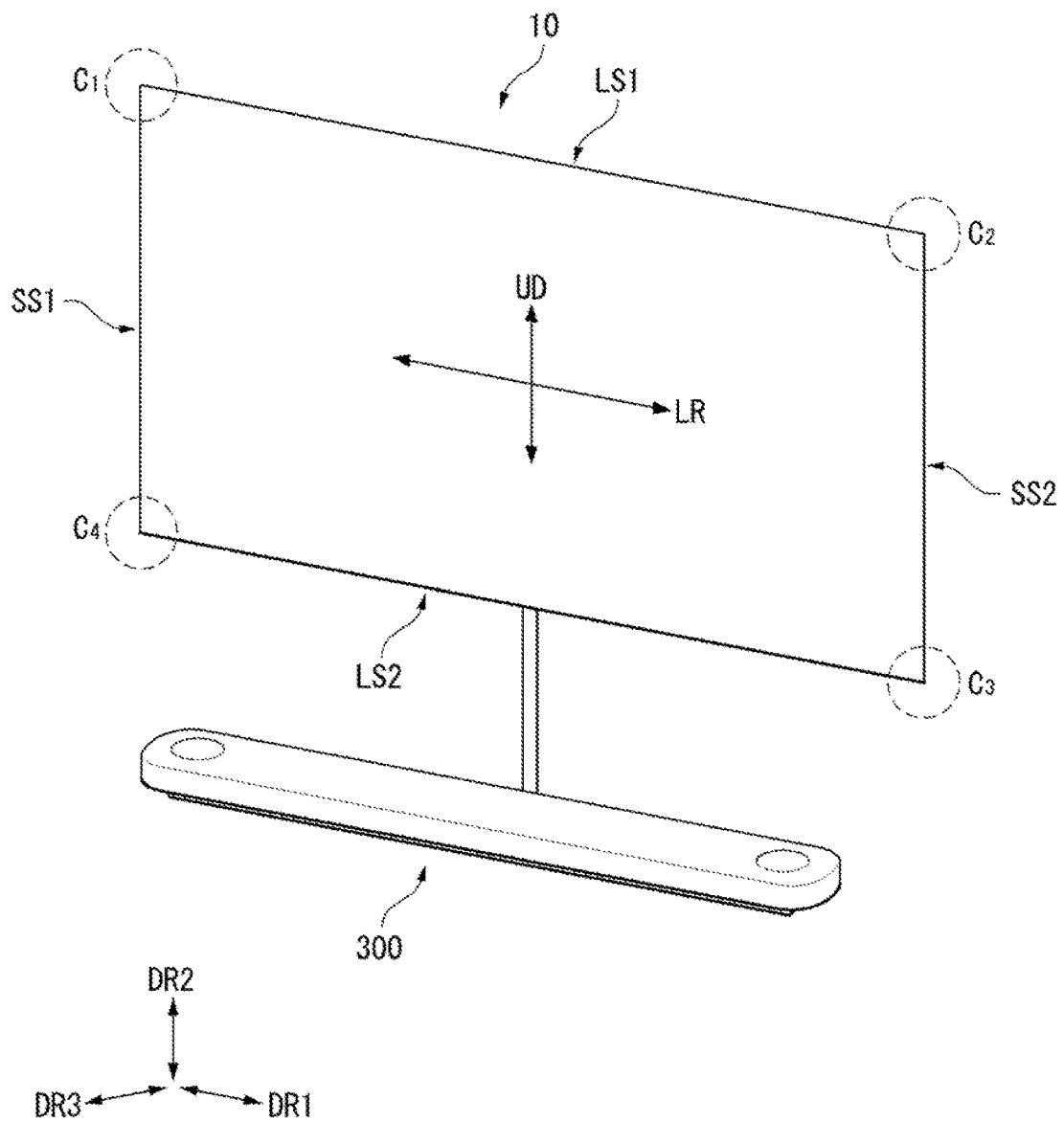
FIGS. 6 and 7 are views showing an example of a sound system and a display device having the same according to an embodiment of the present invention.
Figure 7:
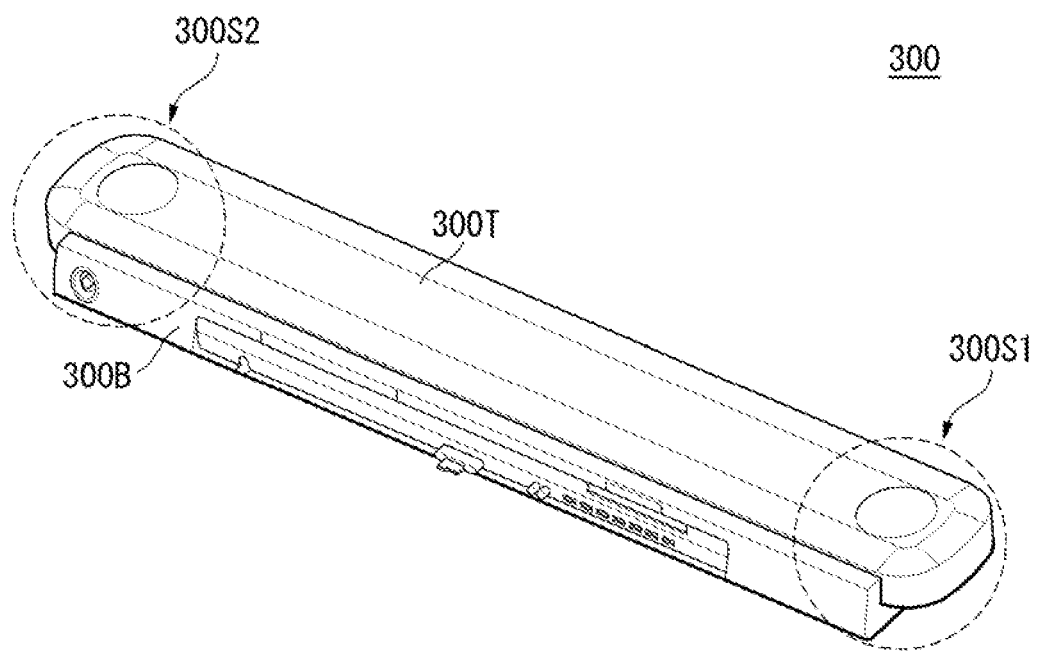
Figure 8:
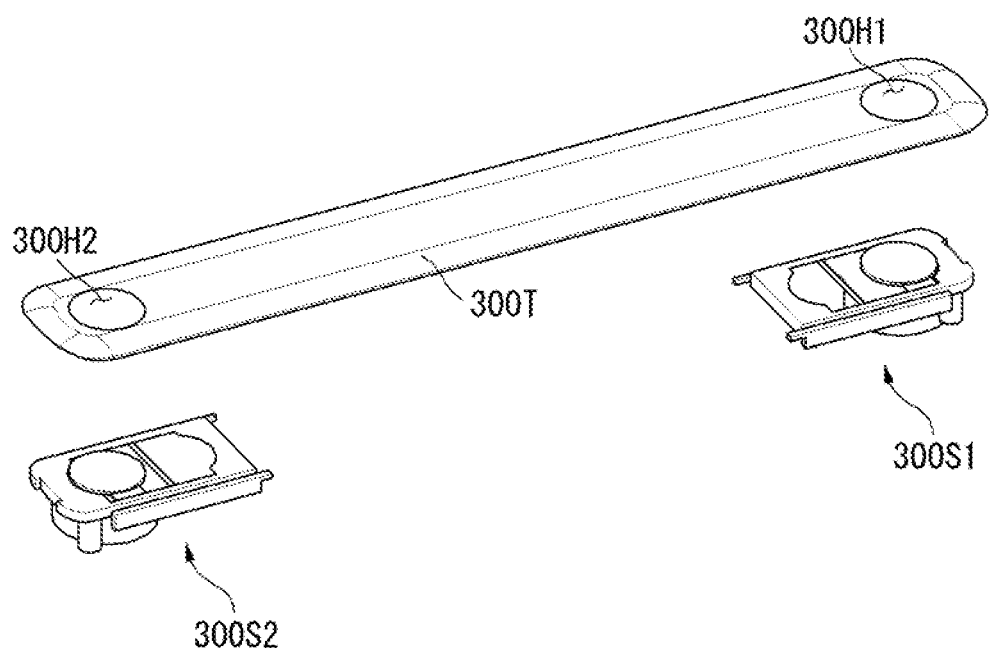
FIG. 8 is a view showing an example of a sound system according to an embodiment of the present invention.

Referring FIGS. 6 to 8, the sound system 300 may be separated from the head 10 by a certain distance. The sound system 300 may be connected to the head 10 electrically. The sound system 300 may include a plurality of speaker modules 300S1 and 300S2. The plurality of speaker modules 300S1 and 300S2 may be installed inside the sound system 300. The sound system 300 may include a case 300B, 300T.

The case 300B, 300T may include a bottom case 300B and a top case 300T. A part of the speaker modules 300S1 and 300S2 may be exposed to the outside at a part of the top case 300T. The top case 300T may have openings 300H1 and 300H2. The openings 300H1 and 300H2 may be formed on one side or both sides of the top case 300T.

The first speaker module 300S1 may be located on the left or right side of the case 300B, 300T and the second speaker module 300S2 may be located on the right or left side of the case 300B, 300T. The first opening 300H1 may be formed on the left or right side of the top case 300T and the second opening 300H2 may be formed on the right side or the left side of the top case 300T. A part of the first speaker module 300S1 may be exposed to the outside of the top case 300T through the first opening 300H1 and a part of the second speaker module 300S2 may be exposed to the outside of the top case 300T2 through the second opening 300H2.

Figure 9:
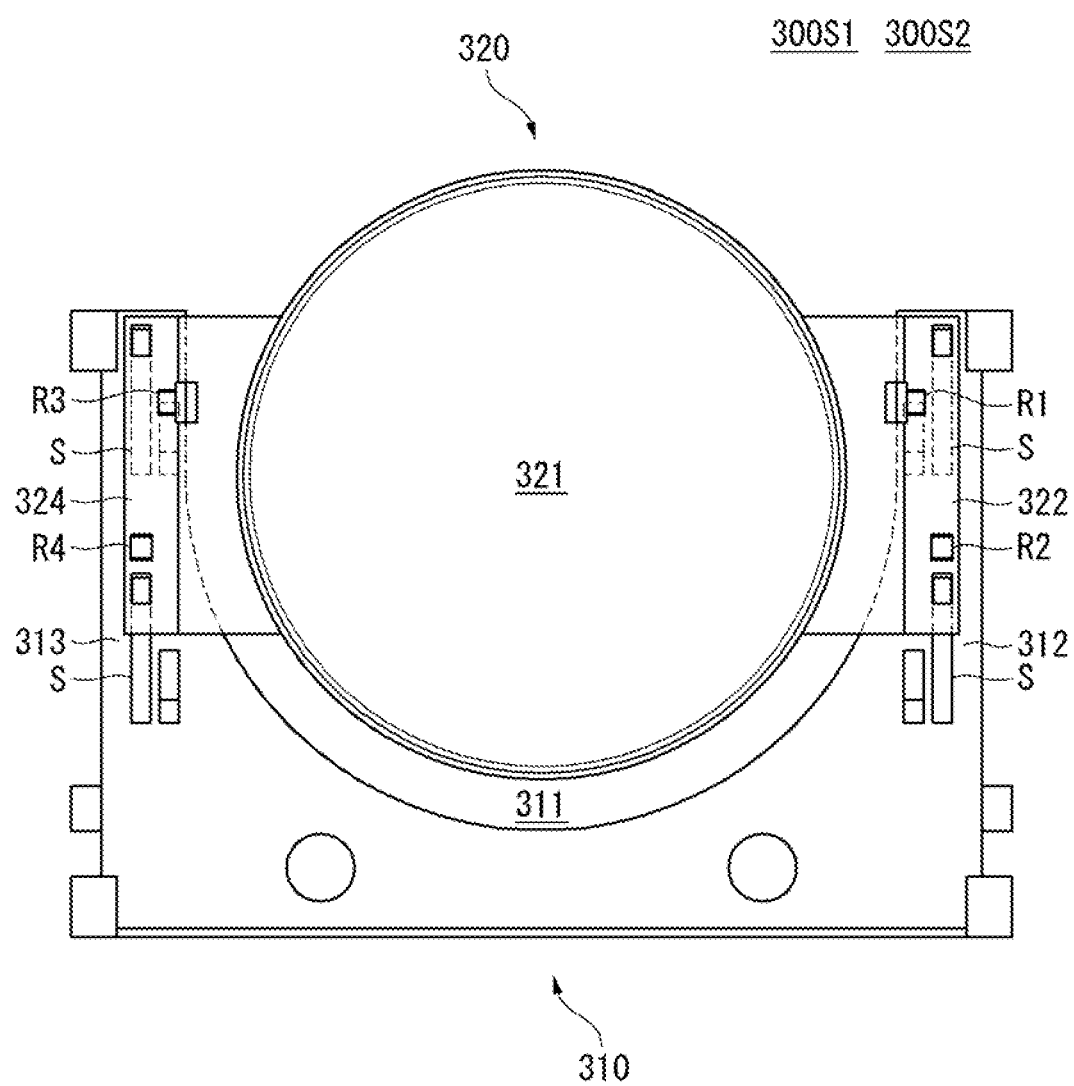
FIGS. 9 to 17 are views showing examples of the automatic open/close structure of a sound system according to an embodiment of the present invention.
Figure 10:
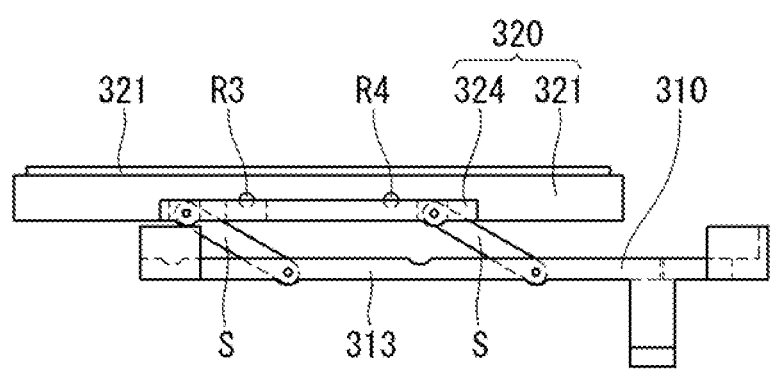

Referring FIGS. 9 and 10, the speaker module 300S1, 300S2 may include a slider 310 and a cap 320. The slider 310 may have a plate shape. The slider 310 may have a semicircular opening 311. The semicircular opening 311 may be referred to as an opening portion 311. The cap 320 may include a circle 321 and bridge 322, 324.

The circle 321 may have a smaller diameter than the diameter of the opening 311 of the slider 310. The circle 321 can be positioned in the opening 311 of the slider 310. The bridges 322 and 324 may extend from the circle 321. The bridges 322 and 324 may extend from one side or both sides of the circle 321. The bridges 322 and 324 may be placed on the slider 310. The shape of the circle 321 can be variously modified.

The slider 310 may include a first wing 312 and a second wing 313. The cap 320 may include a first bridge 322 and a second bridge 324. The first bridge 322 may be mounted on the first wing 312 or fastened to the first wing 312. The second bridge 324 may be mounted on the second wing 313 or fastened to the second wing 313. The first bridge 322 and the second bridge 324 can move up and down from the upper part of the first wing 312 and the second wing 313. The first bridge 322 and the second bridge 324 may be coupled to the first wing 312 and the second wing 313 by an elastic member S. The elastic member S may be, for example, a spring.

The cap 320 may include rollers R1 to R4. The rollers R1 to R4 may be installed on the bridges 322 and 324. The first roller R1, R2 may be located at the first bridge 322 and the second roller R3, R4 may be located at the second bridge 324. The first roller R1, R2 and/or the second roller R3, R4 may be plural. The rollers R1 to R4 may be exposed above the bridges 322 and 324.

Figure 11:
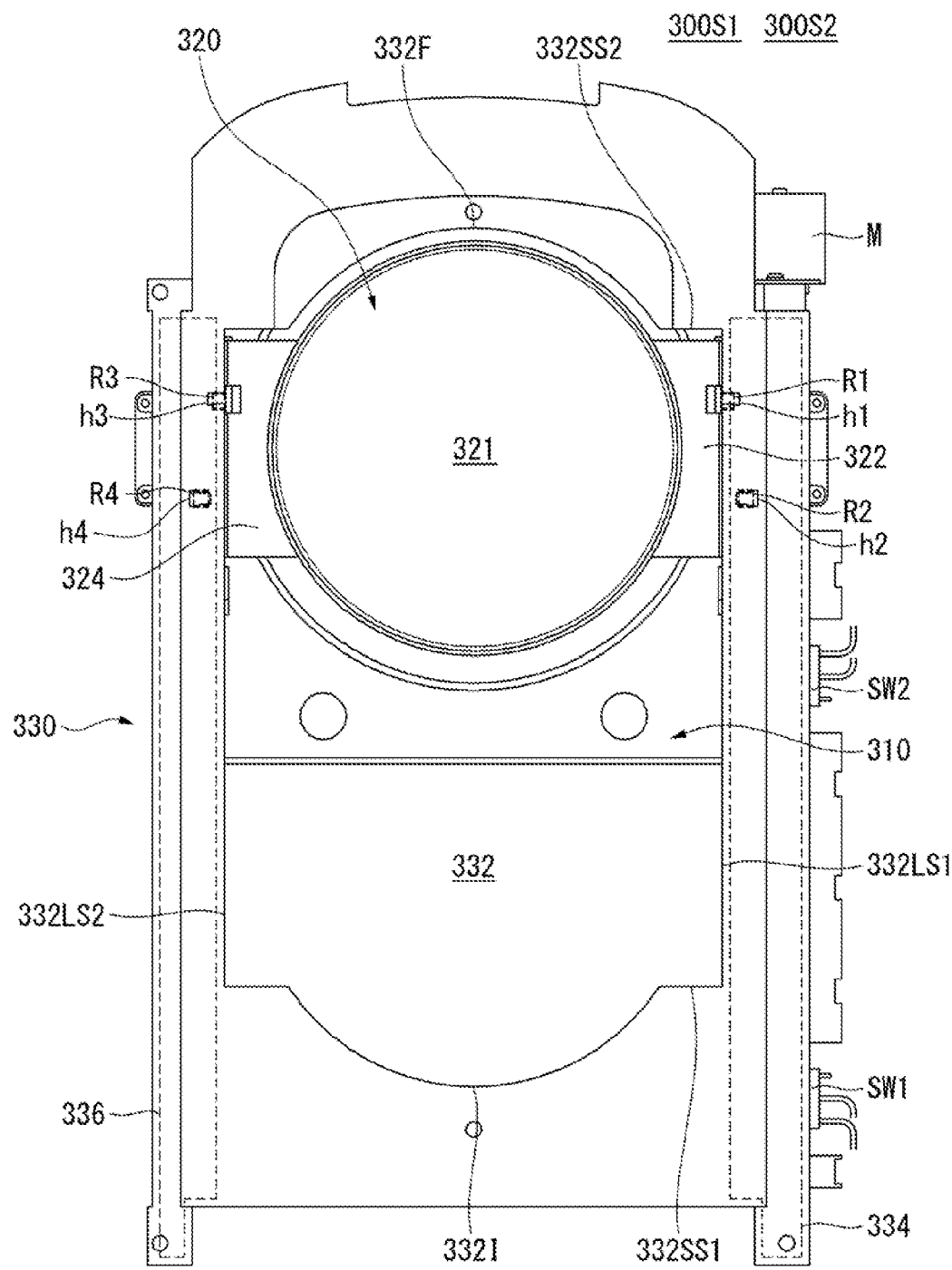

Referring to FIG. 11, the base cover 330 may have an opening 332, a first side 334, and a second side 336. The opening 332 includes a first long side 332LS1, a second long side 332LS2, a first short side 332SS1, a second short side 332SS2, a first bay 332I, and a second bay 332F. The opening 332 may be referred to as an opening portion 332.

The opening 332 may have elongated shape as a whole. The first long side 332LS1 and/or the second long side 332LS2 may be straight. The first short side 332SS1 and/or the second short side 332SS2 may be straight or curved.

A first bay 332I may be formed on the first short side 332SS1. The first bay 332I may have a shape depressed into the inside of the base cover 330. The first bay 332I may be adjacent to the first short side 332SS1. A second bay 332F may be formed on the second short side 332SS2. The second bay 332F may have a shape depressed into the inside of the base cover 330. The second bay 332F may be adjacent to the second short side 332SS2. A second bay 332F may be formed on the second short side 332SS2. The first bay 332I may correspond to a side of the cap 320 or the circle 321 and the second bay 332F may correspond to another side of the cap 320 or the circle 321.

The first side 334 may be located adjacent the first long side 332LS1 and the second side 336 may be located adjacent the second long side 332LS2. The first side 334 and/or the second side 336 may be referred to as a rail.

The driving unit M may be installed adjacent to the first side 334. For example, the driving unit M may be a motor. The driving unit M may be installed at an end of the first side 334 to provide rotational force. The driving unit M can be referred to as a first driving unit.

The rollers R1 to R4 may be positioned below the first side 334 or the second side 336. The rollers R1 to R4 can move together with the slider 310 in the length direction of the first side 334 or the second side 336. The first side 334 or the second side 336 may have holes h1 to h4 or grooves h1 to h4. The rollers R1 to R4 can be moved together with the slider 310 along the first side 334 or the second side 336 and then inserted into the holes h1 to h4 at a predetermined position. The holes are available to be referred to as grooves, and grooves are available to be referred to as holes.

At this time, the cap 320 can be raised. Referring to FIG. 10, the upward movement of the cap 320 may be performed at the moment when the roller R1 to R4 is inserted into the holes h1 to h4.

A plurality of holes h1 to h4 may be formed in the first side 334 or the second side 336. The plurality of holes h1 to h4 may include first holes h1 and h3 and second holes h2 and h4. For example, the first holes h1 and h3 and the second holes h2 and h4 may be formed on the first side 336. The first holes h1 and h3 may not be arranged in line with the second holes h2 and h4. A line from the first hole h1 to the second hole h2 may form an inclination with respect to the first side 334. In other words, the second hole h2 may be beside of a trace of the first roller R1, and the first hole h1 may be beside of a trace of the second roller R2. A line from the first hole h3 to the second hole h4 may form an inclination with respect to the second side 336. In other words, the second hole h4 may be beside of a trace of the first roller R3, and the first hole h3 may be beside of a trace of the second roller R4. Above arrangement of the holes h1 to h4 may be referred to as a staggered arrangement. The first hole h1 may be left or right from the second hole h2 with respect to the first side 334. The first hole h3 may be left or right from the second hole h4 with respect to the second side 336.

The staggered arrangement of the first holes h1 and h3 and the second holes h2 and h4 may aims that the rollers R1 to R4 are inserted into the first holes h1 and h3 or the second holes h2 and h4. That is, one roller R can be inserted in one hole h at a predetermined position.

Figure 12:
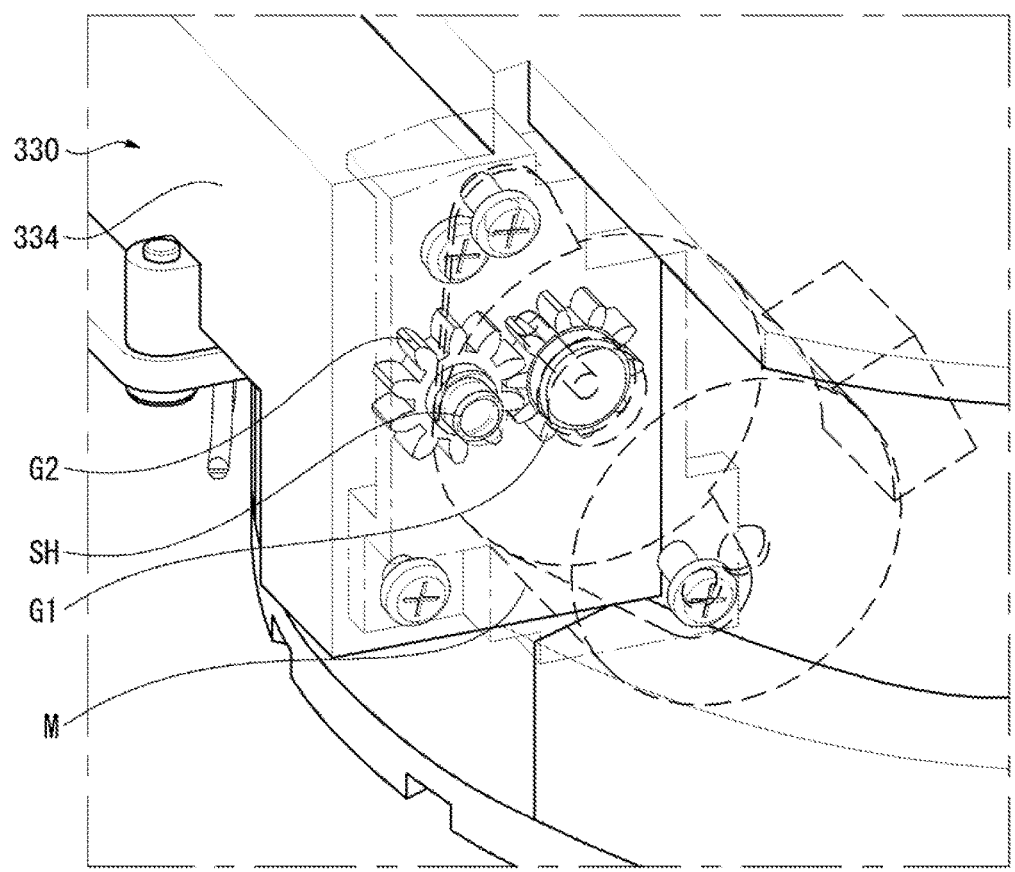
Figure 13:
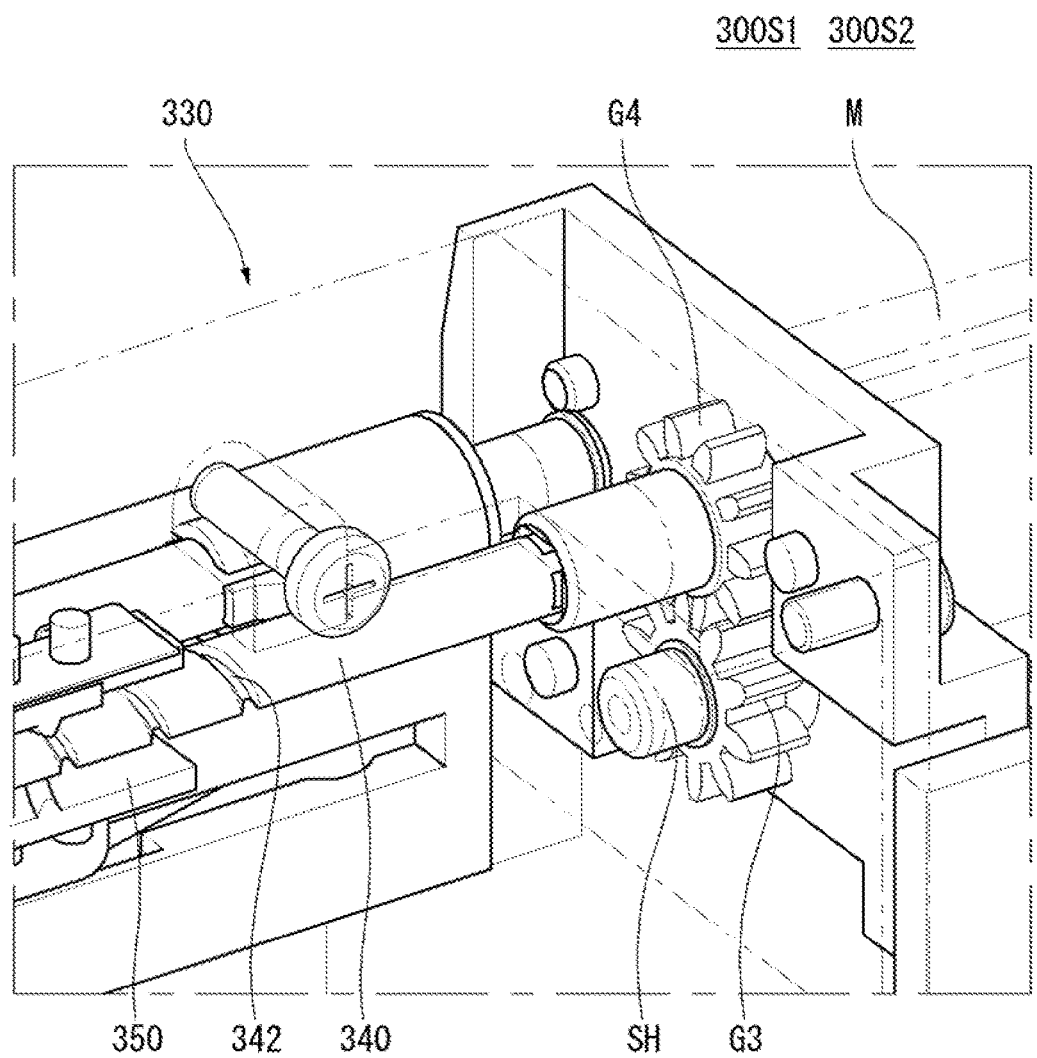

Referring FIGS. 12 and 13, the motor M may be located at a side of the first side 334. The motor M may be mechanically connected to the first gear G1. And the second gear G2 may be engaged with the first gear G1. The second gear G2 may be installed on the first side 334. The second gear G2 can be fastened or fixed to the shaft SH. The shaft SH may be installed in the first side 334 or the base cover 330 while passing through the first side 334 from the outside.

The third gear G3 may be located inside the base cover 330 or inside the first side 334 and may be fastened or fixed to the shaft SH. The third gear G3 can rotate in the same manner as the rotation of the second gear G2. The fourth gear G4 can engage with the third gear G3. The fourth gear G4 can be fitted to the lead shaft 340. The lead shaft 340 may rotate by the rotation of the fourth gear G4. The lead shaft 340 may be referred to as a lead screw.

The first gear G1, the second gear G2, the third gear G3 and/or the fourth gear G4 may be referred to as gearbox.

Figure 14:
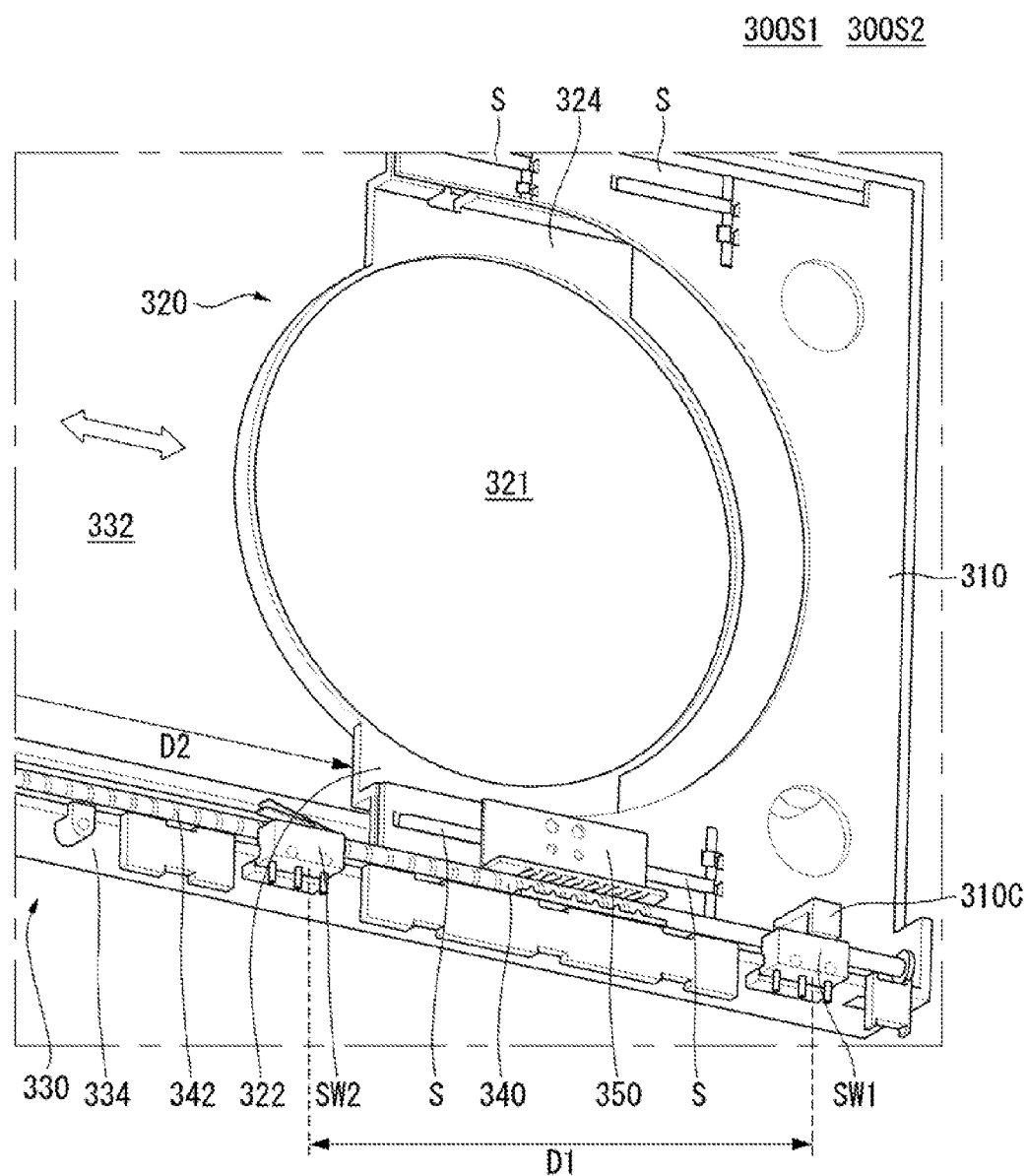
Figure 15:
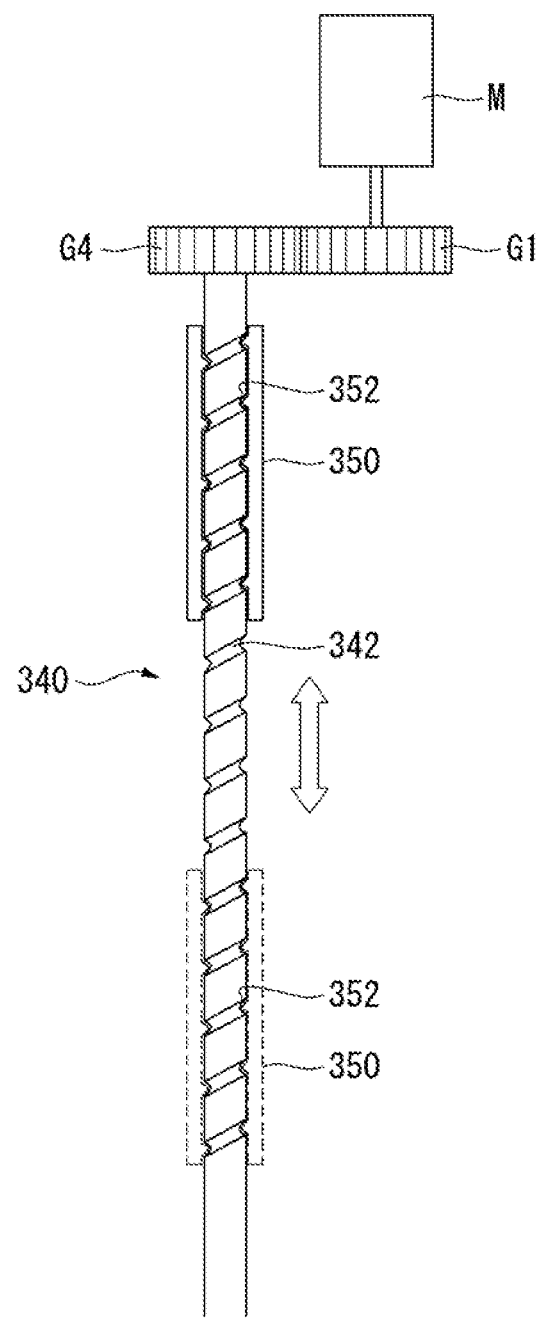

Referring to FIGS. 14 and 15, the lead shaft 340 may be provided with thread 342 on its outer circumferential surface. The thread 342 may be referred to as a screw thread 342. When the motor M provides rotational force to the lead shaft 340 through the gears G1 to G4, the lead screw shaft 340 rotates and the thread 342 can move the holder 350. The thread 342 of the lead shaft 340 may be referred to as a first thread 342. The first thread 342 may have a shape that is recessed inward of the lead shaft 340, for example.

The holder 350 may have thread 352. The thread 352 of the holder 350 may be referred to as a second thread 352. The holder 350 may have a U- or V-shaped cross section as a whole and the second thread 352 may be formed on the inner surface of the holder 350. The second thread 352 can be coupled with the first thread 342 of the lead shaft 340 when the holder 350 is fitted in the lead shaft 340. For example, the second thread 352 may be inserted into the first thread 342. The rotational motion of the lead shaft 340 can be converted into a linear motion of the holder 350. The second thread 352 may be formed of a plurality of projections.

The holder 350 may be fixed or fastened to the slider 310. The holder 350 may move with the slider 310. When the holder 350 moves with respect to the lead shaft 340, the slider 310 may move with respect to the base cover 330.

The base cover 330 may include switches SW1 and SW2 under the first side 334. The first switch SW1 may be spaced a certain distance D1 from the second switch SW2. This distance D1 may correspond to the distance D2 that the cap 320 can move in the opening 332.

The slider 310 may include a switch contactor 310C. The switch contactor 310C may protrude from the lower side or lower surface of the slider 310. The switch contactor 310C may contact the first switch SW1 or the second switch SW2. When the cap 320 or the slider 310 moves with respect to the base cover 330, the switch contactor 310C may contact the first switch SW1 or the second switch SW2.

The first switch SW1 or the second switch SW2 may control the operation of the driving unit M.

Figure 16:
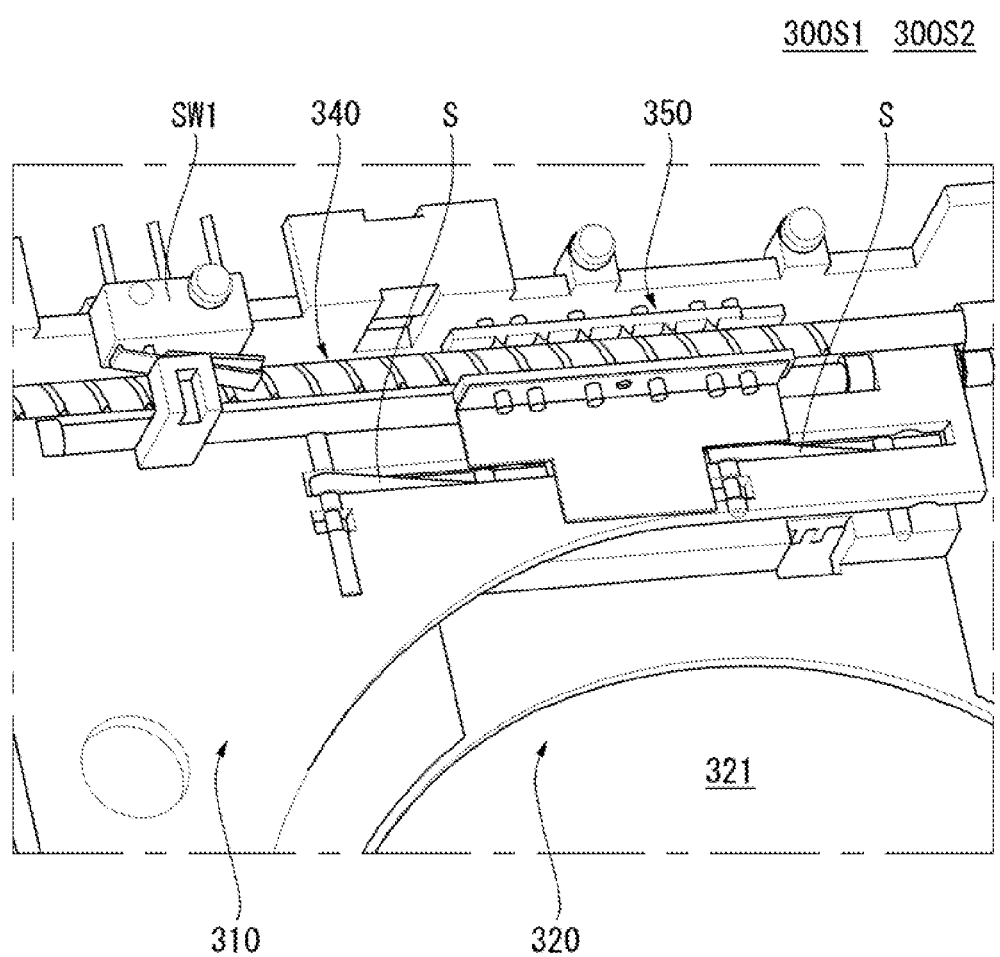
Figure 17:
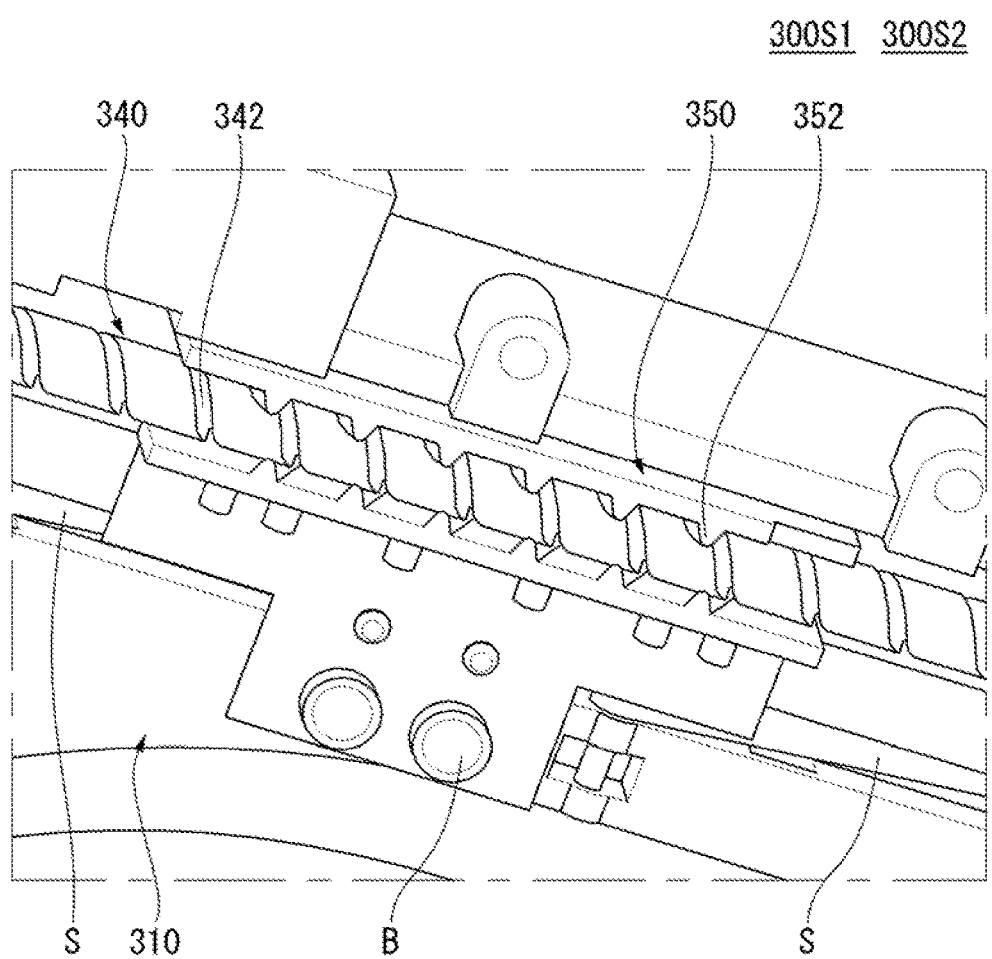

Referring to FIGS. 16 and 17, the holder 350 may have elasticity. For example, the holder 350 may have a portion formed of a leaf spring. The holder 350 can provide an elastic force in a direction perpendicular to the longitudinal direction of the lead shaft 340. The holder 350 may be coupled or decoupled with the lead shaft 340. The number of threads 352 of the holder 350 may vary according to the elasticity of the holder 350.

The elastic force of the holder 350 can be set to a constant intensity. The elastic force of the holder 350 may mean an elastic force per unit distance. If the cap 320 or the slider 310 is not moved by an external force while the holder 350 is moving on the lead shaft 340, the second thread 352 of the holder 350 is decoupled with the second thread 342 of the lead shaft 340. If the second thread 352 is derailed from the first thread 342, the holder 350 may not perform linear motion even if the lead screw 340 rotates. In case that the movement of the cap 320 or the slider 310 is abnormal, the holder 350 may provide the speaker module 300S1, 300S2 with safe structure.

Figure 18:
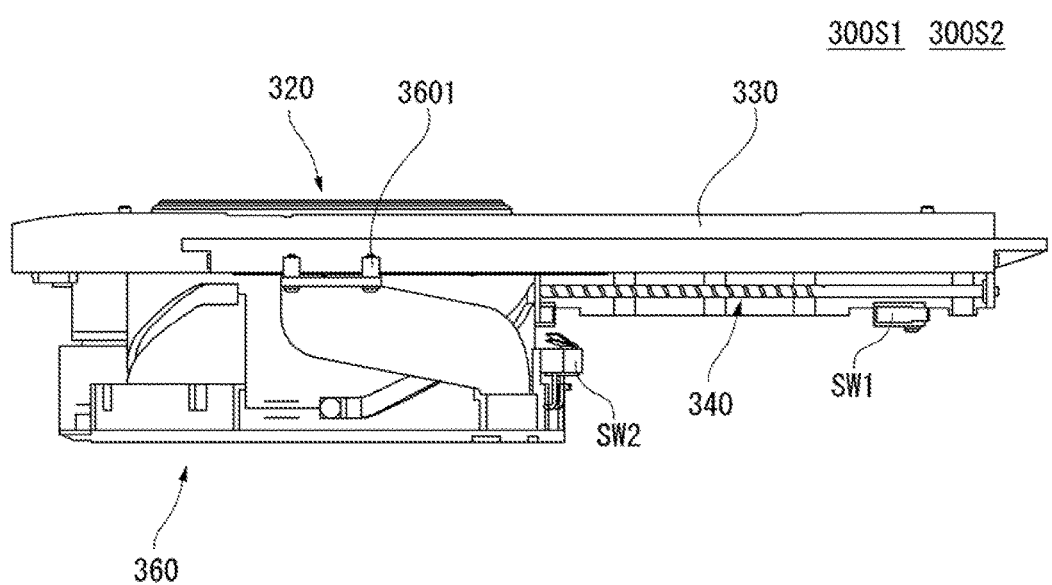
FIGS. 18 to 27 are views showing examples of an automatic lifting structure of a sound system according to an embodiment of the present invention.

Referring to FIG. 18, the lifting unit 360 may be coupled with the base cover 330. The lifting unit 360 may be mounted on the lower portion of the base cover 330. The lifting unit 360 may have a fastening portion 3601. The fastening portion 3601 may be fixed to the base cover 330.

Figure 19:
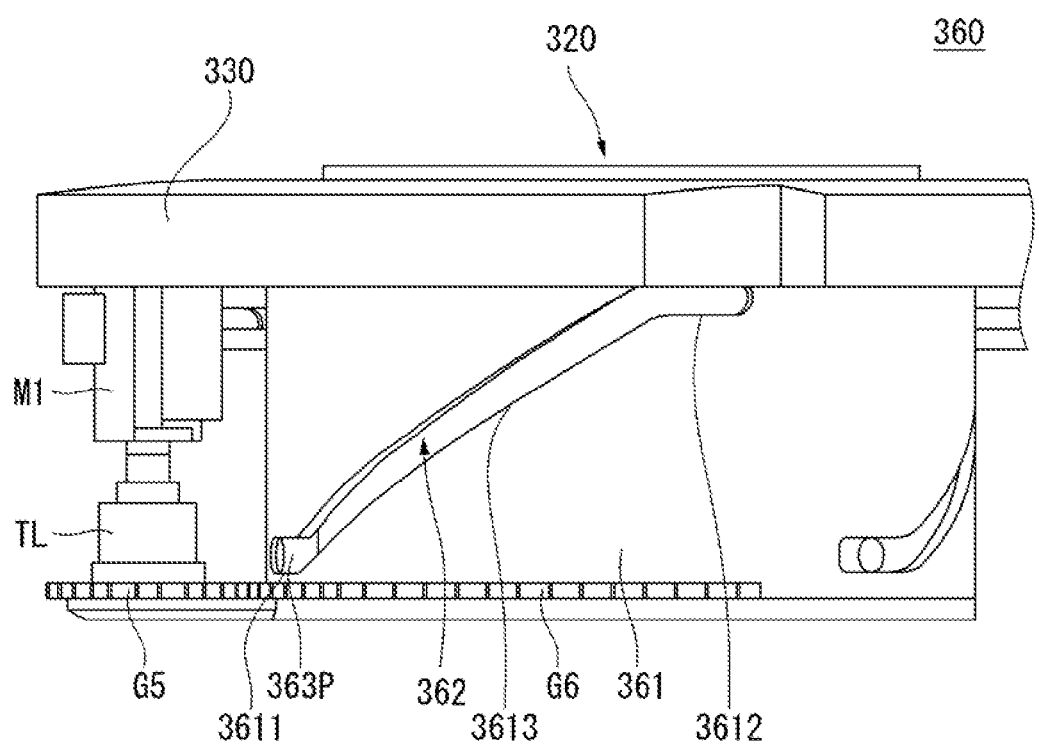
Figure 20:
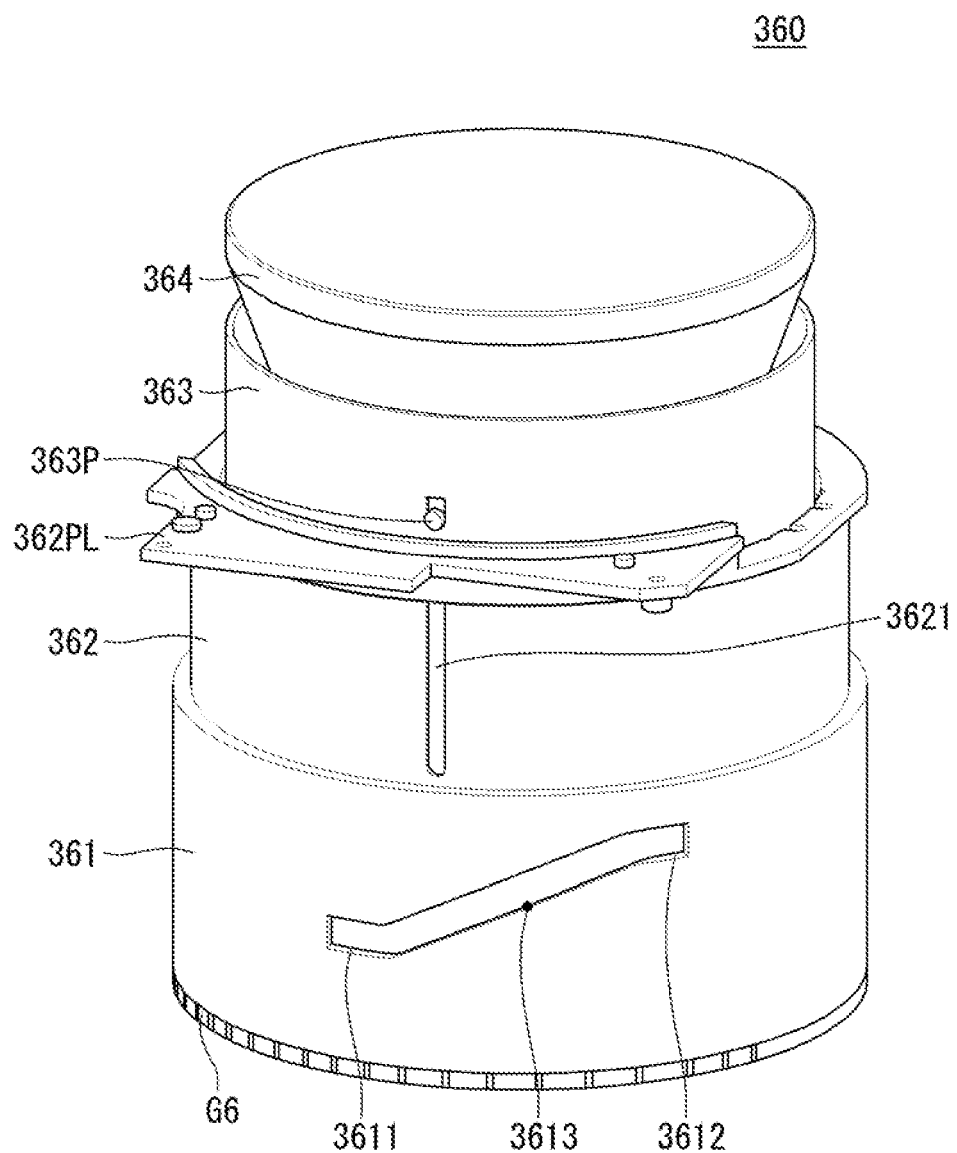

Referring to FIGS. 19 and 20, the lifting unit 360 may include an outer housing 361, an inner housing 362, and a lifting housing 363. The outer housing 361, the inner housing 362, and/or the lifting housing 363 may have a cylindrical shape.

The speaker 364 may be mounted in or fixed to the lifting housing 363. The speaker 364 may be located inside the lifting housing 363. The speaker 364 may move together with the lifting housing 363. The lifting housing 363 may have a protrusion 363P. The protrusion 363P may protrude from the outer surface of the lifting housing 363. A plurality of protrusions 363P may be formed.

The lifting housing 363 may be mounted in or inserted into the inner housing 362. The lifting housing 363 may be located inside the inner housing 362. The inner housing 362 may have a guide slot 3621 formed to be long in the vertical direction. The guide slot 3621 may be vertically formed on one or both surfaces of the inner housing 362. The guide slot 3621 may have the shape of a slot. The protrude 363P of the lifting housing 363 may be inserted into the guide slot 3621 and may be moved up and down along the guide slot 3621.

The inner housing 362 may be mounted in or inserted into the outer housing 361. The inner housing 362 may be located inside the outer housing 361. Lift slot 3611, 3612, and 3613 may be formed on the outer housing 361. Lift slot 3611, 3612, and 3613 may extend from the left lower portion to the upper right portion of the outer housing 361. Lift slot 3611, 3612, and 3613 may extend from the right lower portion to the left upper portion of the outer housing 361. Lift slot 3611, 3612, and 3613 may have a shape of a groove formed on inner surface of the outer housing 361. Lift slot 3611, 3612, and 3613 may have a shape of a slot. The lift slot 3611, 3612, and 3613 may be formed to pass through the inner and outer surfaces of the outer housing 361. Lift slot 3611, 3612, and 3613 may be formed long in the diagonal direction of the outer housing 361.

The lift slot 3611, 3612, and 3613 may include a first part 3611, a second part 3612, and a third part 3613. The first part 3611 may be formed at a lower portion of the outer housing 361. The first part 3611 may be formed horizontally. The second part 3612 may be formed on the upper portion of the outer housing 361. The second part 3612 may be formed horizontally. The second part 3612 may be spaced apart from the first part 3611 in the left-right direction. The third part 3613 may connect the first part 3611 and the second part 3612. The second part 3612 may be located with respect to the first part 3611 in an oblique direction.

Figure 21:
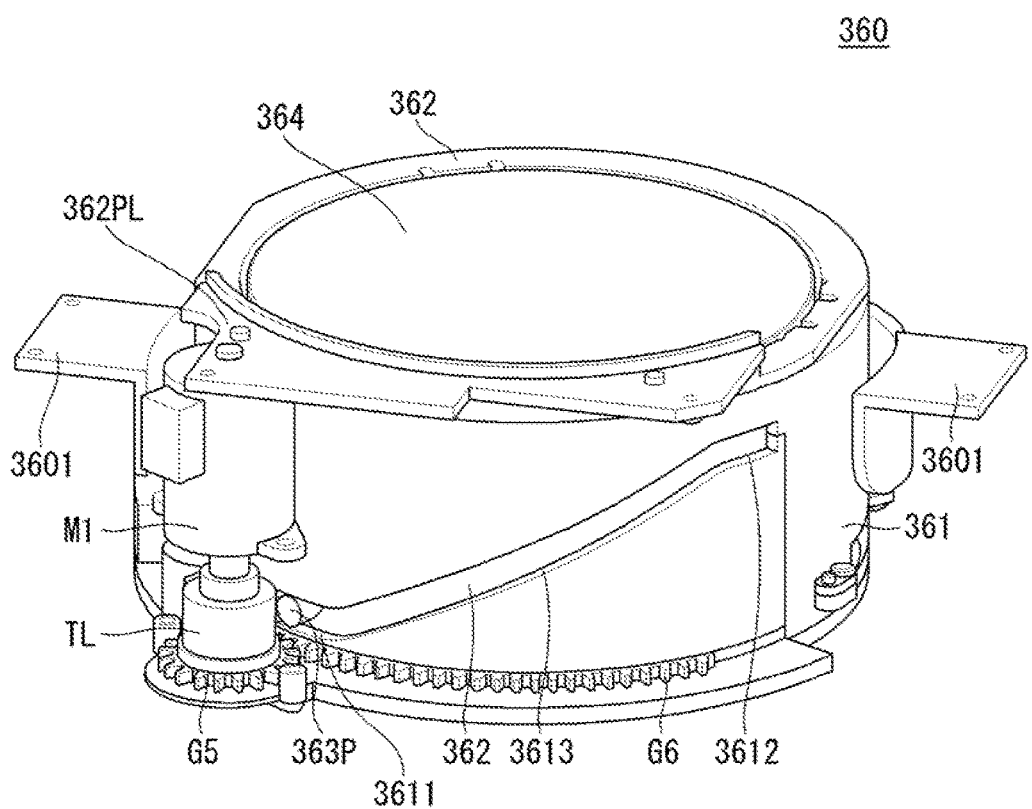
Figure 22:
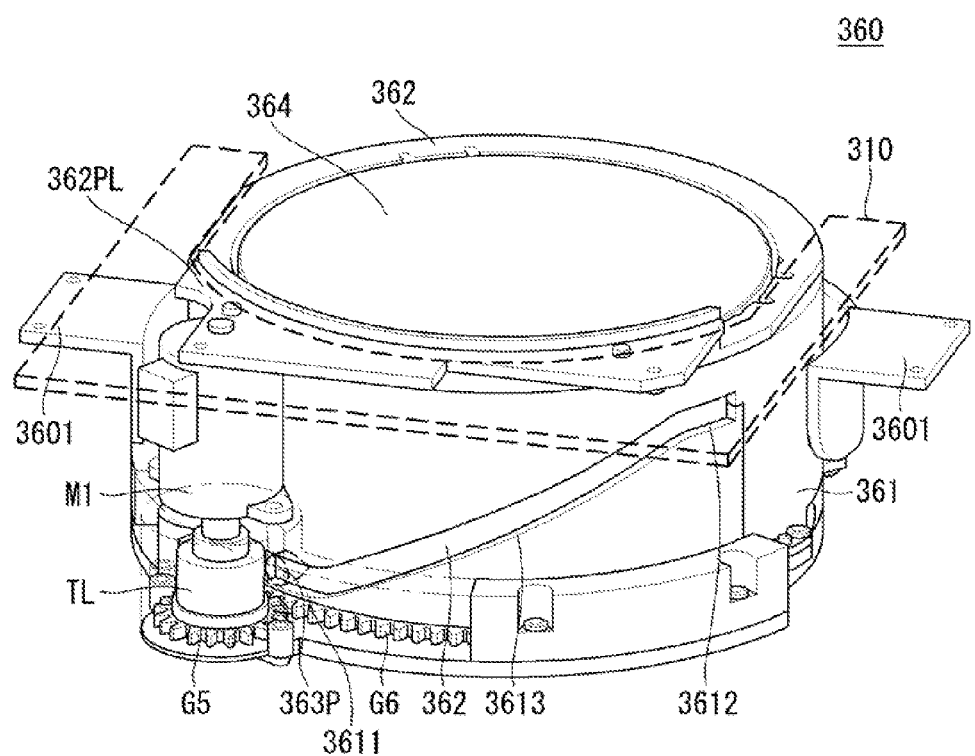

Referring to FIGS. 21 and 22, the outer housing 361 may include a sixth gear G6. The sixth gear G6 may be formed on the outer surface of the outer housing 361. The sixth gear G6 may be formed at the lower portion of the outer surface of the outer housing 361. The sixth gear G6 may be coupled with the outer housing 361.

And the fifth gear G5 can be engaged with the sixth gear G6. The torque limiter TL may be positioned near the fifth gear G5. For example, the torque limiter TL may be positioned above the fifth gear G5. For example, the torque limiter TL can be engaged with the upper surface of the fifth gear G5. The torque limiter TL may be mechanically connected to the fifth gear G5. For example, the torque limiter TL may be a friction clutch.

The driving unit M1 may be located outside the outer housing 361. The driving unit M1 may be fixed to the inner housing 362. The inner housing 362 may have a flange 362PL and the drive unit M may be mounted on or fixed to the flange 362PL. For example, the driving unit M1 may be a motor.

The driving unit M1 may be mechanically connected to the torque limiter TL and may provide rotational force to the torque limiter TL. The driving unit M1 may be referred to as a second driving unit.

Figure 23:
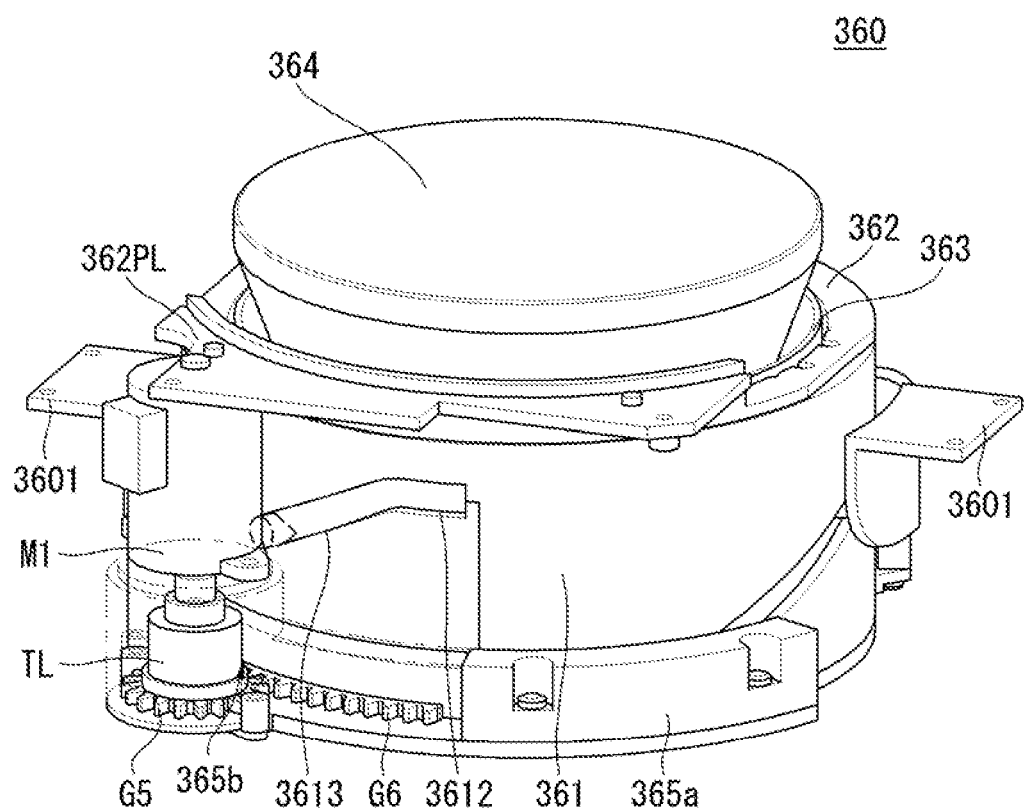

Referring to FIGS. 22 and 23, when the driving unit M1 provides rotational force to the fifth gear G5, the fifth gear G5 may rotate the outer housing 361. When the outer housing 361 rotates, the inner housing 362 may not rotate. When the outer housing 361 rotates, the lift slot 3611, 3612, 3613 may provide the protrusion 363P with a force. The protrusion 363P may be guided in up down direction by the guide slot 3621 (see FIG. 20). So, when the outer housing 361 rotates, the protrusion 363P moves upward and downward along the guide slot 3621.

When the protrude 363P moves along the guide slot 3621, the lifting housing 363 may move up and down, and the speaker 364 may move up and down.

The rotational force provided by the driving unit M1 fixed to the inner housing 362 may rotate the outer housing 361. The outer housing 361 may rotate relative to the inner housing 362. The lift slot 3611, 3612, 3613 can rotate with respect to the guide slots 3621 (see FIG. 20). The protrude 363P may move up and down in the guide slot 3621 (see FIG. 20).

The first gear cover 365a may cover the sixth gear G6 of the outer housing 361. The second gear cover 365b may cover the fifth gear G5 and/or the torque limiter TL. The first gear cover 365a and the second gear cover 365b may be connected or coupled with each other. The first gear cover 365a and the second gear cover 365b may prevent the driving system of the lifting unit 360 from being contaminated by an external foreign material. The driving system may include a motor M1, a torque limiter TL, a fifth gear G5, and a sixth gear G6.

The speaker 364 may be prevented from moving up and down by an external force despite the continuous rotation of the driving unit M1. At this time, the rotational force of the driving unit M1 may not be transmitted to the fifth gear G5 due to the slip caused by the torque limiter TL. In other words, the torque limiter TL may decouple the driving unit M1 from the fifth gear G5. Thus, the safety of the driving system of the lifting unit 360 can be secured.

Figure 24:
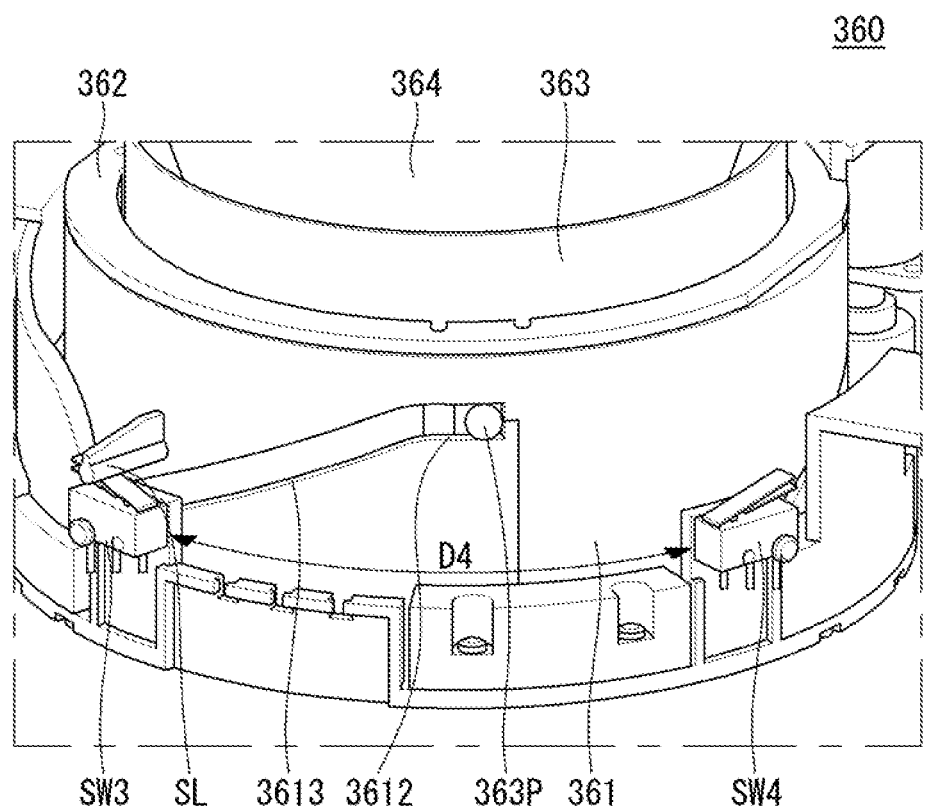

Referring to FIG. 24, the switch SW3 and SW4 may be located outside the outer housing 361. The switch SW3 and SW4 may be plural. The third switch SW3 may be spaced a certain distance D4 from the fourth switch SW4. The certain distance D4 may be along the outer surface of the outer housing 361. The outer housing 361 may have a switching lever SL. The switching lever SL may protrude from the outer surface of the outer housing 361. The switching lever SL may operate the third switch SW3 or the fourth switch SW4. For instance, the switching lever SL may press the third switch SW3 or the fourth switch SW4 in accordance with the rotation of the outer housing 361. The third switch SW3 and/or the fourth switch SW4 may regulate the operation of the driver M1. Accordingly, the rotation range of the outer housing 361 may be limited, and the range of the vertical movement of the speaker 364 may also be constant.

Figure 25:
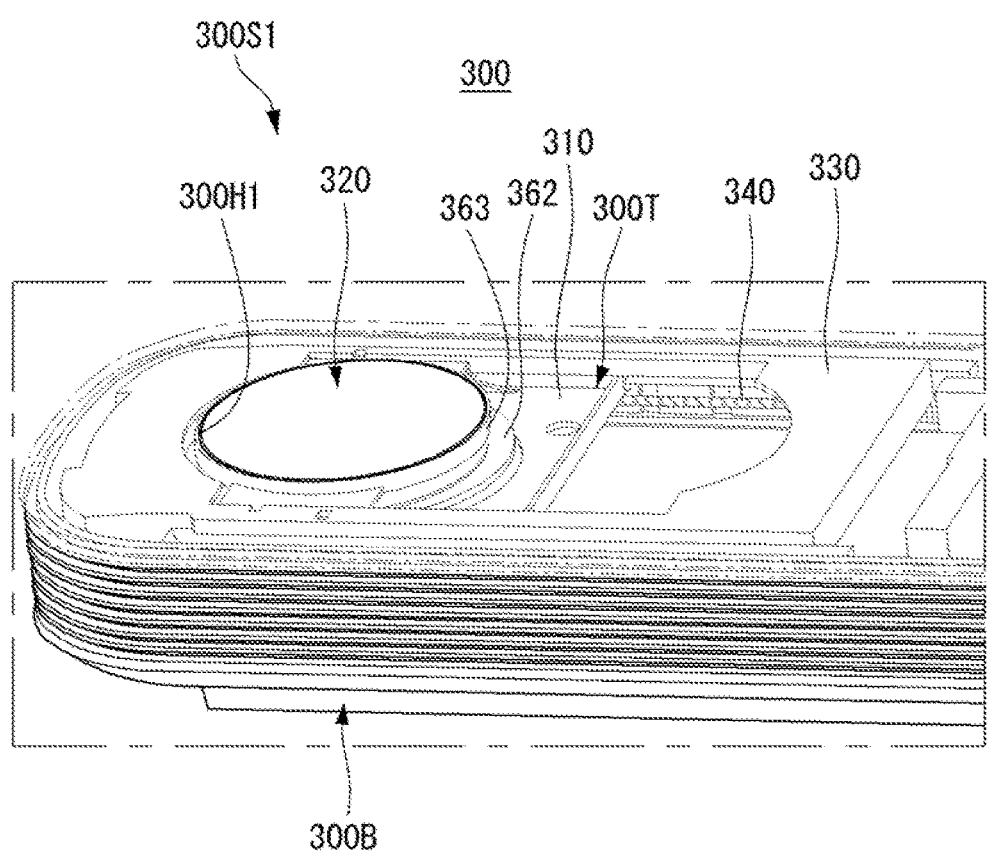

Referring to FIG. 25, the cap 320 of the speaker module 300S1 may cover the opening 300H1 of the top case 300T. Accordingly, it is possible to protect the speaker module 300S1 and to prevent foreign matter from entering the sound system 300. At this time, the display panel 100 (see FIG. 2) may not provide an image. In other words, the head 10 (shown in FIG. 2) may be in a state in which power is not supplied to the head 10.

Figure 26:
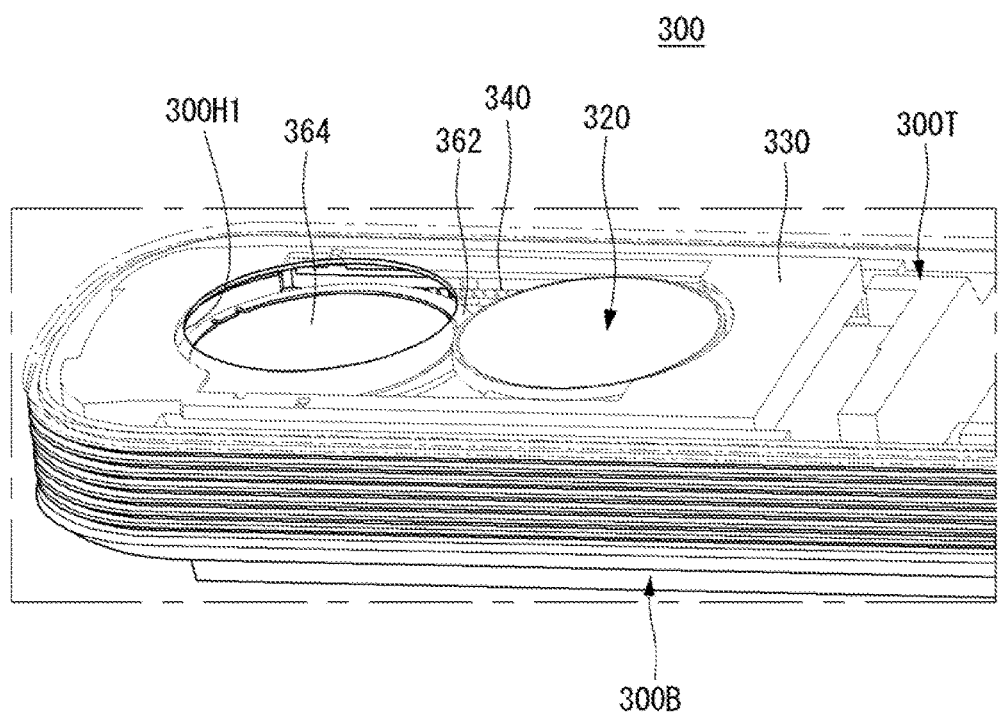

Referring to FIG. 26, the cap 320 may be slightly lowered from the opening 300H1 to the lower portion of the top case 300T. And then the cap 320 may move to the inside of the top case 300T as the slider 310 moves in left-right direction. And then the opening 300H1 of the top case 300T may be in an open state. Simultaneously, the display panel 100 (see FIG. 2) can provide an image. In other words, the head 10 (see FIG. 2) may be in a state of being supplied with electric power.

Figure 27:
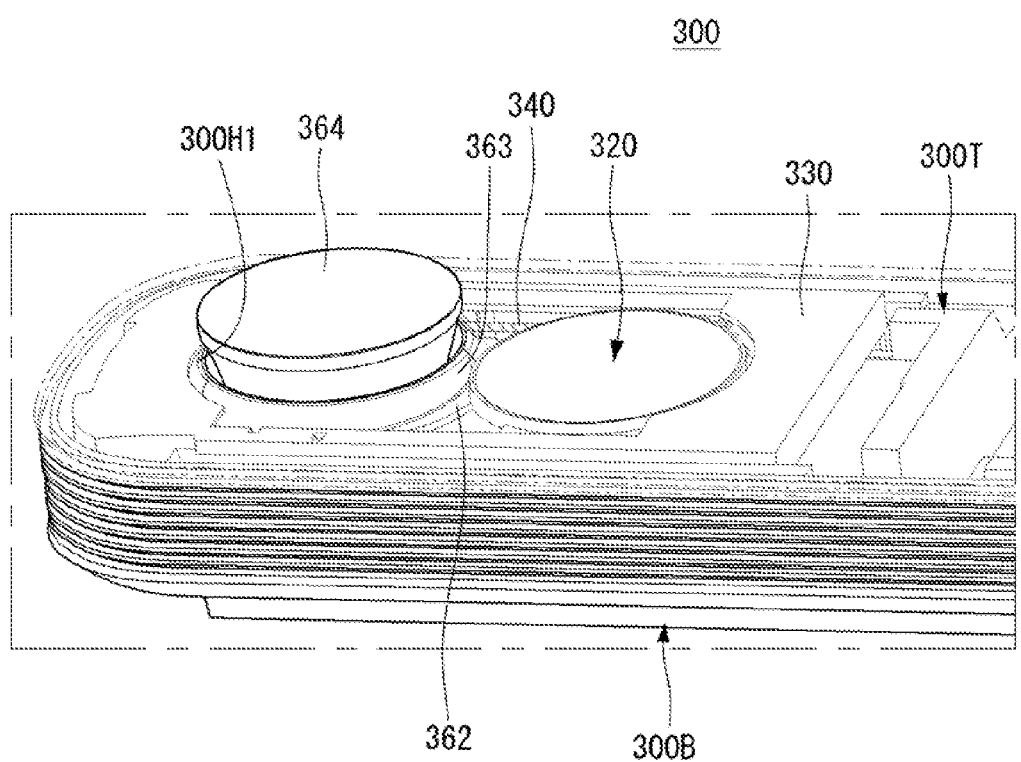

Referring to FIG. 27, the speaker 364 may ascend from the lower of the opening 300H1 to the upper of the opening 300H1. Accordingly, the speaker 364 may be exposed to the outside, and the sound generated from the speaker 364 can be transmitted to the outside without interference by the internal structure of the sound system 300. Simultaneously the display panel 100 (see FIG. 2) may provide an image. In other words, the head 10 (see FIG. 2) may be in a state of being supplied with electric power.

Figure 28:
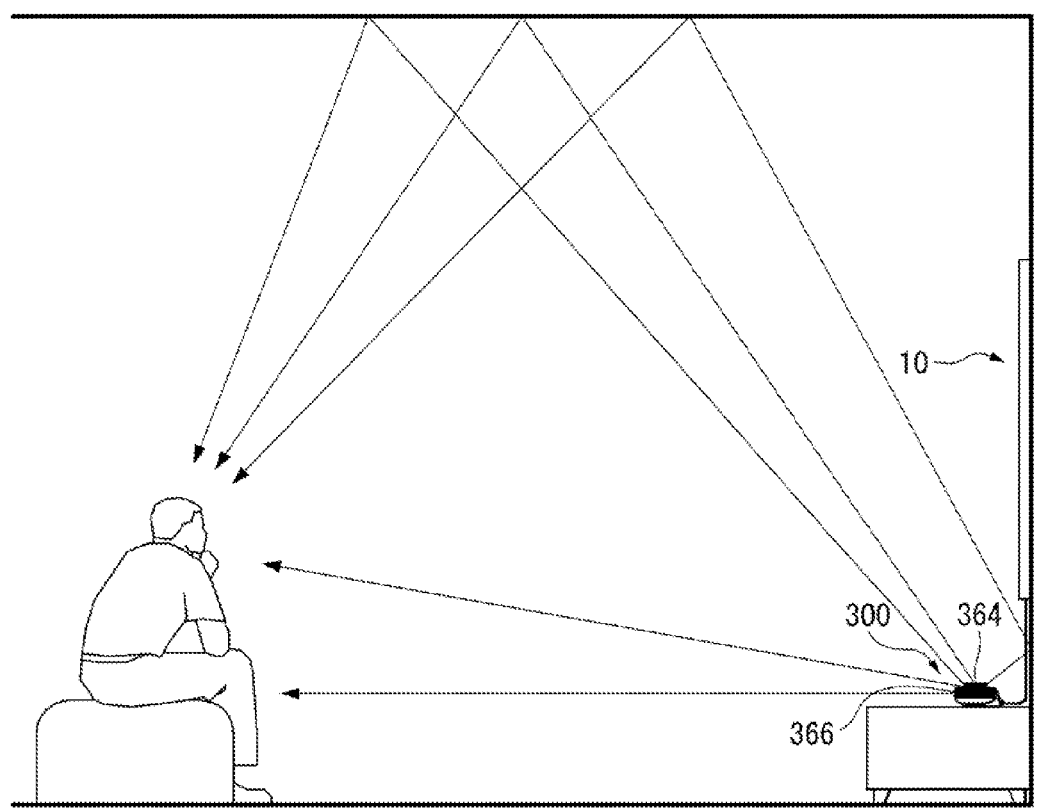
FIG. 28 is a view showing an example of a sound system of a display device according to an embodiment of the present invention.

Referring to FIG. 28, the sound may be generated at the speaker 364 and reflected to the ceiling or the wall and transmitted to the viewer. For example, the sound may be a middle tone or a high tone. The speakers 364 and 366 may be plural. The first speaker 366 may generate sound to the outside through the front surface of the sound system 300. For example, the first speaker 366 may be a region of bass or treble. The second speaker 364 may be the speaker 364 described above. The sound system 300 may provide a various range of sound to the viewer. Although not shown, a separate woofer may be provided. The woofer may provide sound in the bass region.

In one aspect, there is provided a sound system comprising: a bottom case; a top case above the bottom case, the top case including an opening; a speaker below the opening; a slider between the top case and the speaker, the slider moving linearly; a cap mounted on the slider, wherein the cap open and close the opening of the top case; a lead screw near the slider, the lead screw rotatable; and a holder fixed to the slider, the holder coupled with the lead screw, wherein the holder moves along an axis of the lead screw in accordance with a rotation of the lead screw.

In another aspect, the lead screw may include a screw thread, and the holder may include a plurality of protrudes fitted in the screw thread of the lead screw.

In another aspect, the holder may has an elasticity.

In another aspect, the holder may be in contact with the lead screw at left side and right side of the lead screw with respect to an axis of the lead screw.

In another aspect, the sound system may further comprise a driving unit connected to the lead screw mechanically. The driving unit may provide the lead screw with a rotational force.

In another aspect, the sound system may further comprise a gearbox positioned between the driving unit and the lead screw. A portion of the gearbox may be connected to the lead screw and another portion of the gearbox may be connected to the driving unit.

In another aspect, the sound system may further comprise a first switch, a second switch spaced apart from the first switch, and a switch contactor formed at the slider. The switch contactor may contact the first switch or the second switch in accordance with a movement of the slider.

In another aspect, the sound system may further comprise a driving unit, wherein the driving unit provides the lead screw with a rotational force, and wherein the first and second switches regulate a driving force supplied to the driving unit.

In another aspect, the sound system may further comprise an elastic member, wherein a side of the elastic member is fixed to the slider and another side of the elastic member is fixed to the cap, wherein the slider includes an opening portion, wherein the cap is positioned in the opening portion, and the cap is provided an elastic force upward of the slider.

In another aspect, the sound system may further comprise a base cover positioned between the top case and the slider, wherein base cover includes a rail on which the slider or the cap moves, wherein a groove is formed on the rail, wherein the cap includes: a circle corresponding to the opening of the top case; a bridge extended from the circle; a roller installed at the bridge, the roller rolling along the rail.

In another aspect, the base cover may include: a first groove formed on the rail; and a second groove formed on the rail, the second groove at left or right from the first groove with respect to an axis of the rail; wherein the cap includes: a first roller installed at the bridge, the first roller corresponding to the first groove; and a second roller installed at the bridge, the second roller corresponding to the second groove.

In another aspect, the base cover may include an opening portion in which the slider moves, and the opening portion of the base cover may have an shape corresponding to a side of the cap in accordance with open and close of the opening.

In another aspect, the holder may be formed of a leaf spring.

In another aspect, the hold may surround a portion of the lead screw.

In another aspect, there is provided a display device comprising a head including a display panel and the sound system. The sound system may be spaced apart from the head and be connected to the display panel electrically.

In another aspect, the speaker may produce a sound in accordance with a image displayed by the display panel.

In another aspect, the cap may open the opening of the top case when the head is provided an electric power, and the cap may close the opening of the top case when an electric power to the head is cut off.

In another aspect, there is provided a sound system comprising a bottom case; a top case above the bottom case, the top case including an opening; an outer housing below the opening, the outer housing rotatable; an inner housing in the outer housing; a lifting housing in the inner housing; and a speaker mounted in the speaker. The lifting housing may include a protrusion projecting from an outer surface of the lifting housing. The inner housing may include a guide slot elongated in up down direction, the guide slot in which the protrusion is inserted. The outer housing may include a lift slot in which the protrusion is inserted. The lift slot may be formed in an oblique direction with respect to up down direction.

In another aspect, the sound system may further comprise a driving unit providing the outer housing with a rotational force.

In another aspect, the sound system may further comprise a first gear formed on an outer surface of the outer housing; and a second engaged in the first gear. The second gear may be provided driving force from the driving unit.

In another aspect, the sound system may further comprise a torque limiter connecting the second gear and the driving unit mechanically.

In another aspect, the torque limiter may be a friction clutch.

In another aspect, the sound system may further comprise a driving unit coupled with the inner housing. The driving unit may supply a rotational force to the outer housing.

In another aspect, the sound system may further a gear cover covering at least one of the first gear and the second gear.

In another aspect, the sound system may further comprise a first switch located near the outer housing; a second switch spaced apart from the first switch, the second switch located near the outer housing; and a switching lever protruding from an outer surface of the outer housing.

In another aspect, there is provided a display device comprising a head and the sound system of claim 1. The sound system of claim 1 may be connected to the head electrically.

In another aspect, the speaker may rise upward through the opening of the top case when an electric power is supplied to the head. The speaker may move downward of the opening of the top case when an electric power supplied to the head is cut off.

In another aspect, there is provided a display device comprising a display unit including a display panel providing images; a housing being apart from the display unit and including an electrical unit and a speaker module; and a cable electrically connected with the display panel and the electrical unit, wherein the electrical unit provides the display unit with a signal and/or power.

In another aspect, the signal and/or power may be transmitted by the cable.

In another aspect, the housing may further comprises a speaker module, the speaker module includes a speaker that is moving up and down.

In another aspect, at least a part of the speaker is located outside of the housing when the speaker is moving up at the housing.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display unit including a display panel providing an image;
a housing being apart from the display unit and including an electrical unit; and
a cable electrically connected with the display panel and the electrical unit,
wherein the electrical unit provides the display panel with a signal and power, and
wherein the housing comprises:
a bottom case;
a top case above the bottom case, the top case including an opening;
a speaker below the opening;
a slider between the top case and the speaker, the slider moving linearly along a bottom surface of the top case;
a cap mounted on the slider, wherein the cap opens and closes the opening of the top case in accordance with the moving of the slider;
a lead screw near the slider, the lead screw being rotatable; and
a holder fixed to the slider, the holder coupled with the lead screw and moving along an axis of the lead screw in accordance with a rotation of the lead screw.

2. The display device of claim 1, wherein the power and the signal are transmitted by the cable.

3. The display device of claim 1, wherein the housing further comprises a speaker module including a speaker that is moving up and down.

4. The display device of claim 3, wherein at least a part of the speaker is located outside of the housing when the speaker is moving up at the housing.

5. The display device of claim 3, wherein the speaker produces a sound in accordance with the image displayed by the display panel.

6. The display device of claim 1, wherein the cap opens the opening of the top case when the display panel is provided with an electrical power, and
wherein the cap closes the opening of the top case when the electrical power to the display panel is cut off.

7. The display device of claim 1, wherein the lead screw includes a screw thread, and
wherein the holder includes a plurality of protrusions fitted in the screw thread of the lead screw.

8. The display device of claim 1, wherein the holder has elasticity.

9. The display device of claim 1, wherein the holder is in contact with the lead screw at a left side and a right side of the lead screw with respect to an axis of the lead screw.

10. The display device of claim 1, further comprising a driving unit connected to the lead screw mechanically,
wherein the driving unit provides the lead screw with a rotational force.

11. The display device of claim 1, further comprising a gearbox positioned between the driving unit and the lead screw,
wherein a portion of the gearbox is connected to the lead screw and another portion of the gearbox is connected to the driving unit.

12. The display device of claim 1, further comprising:
a first switch;
a second switch spaced apart from the first switch; and
a switch contactor formed at the slider,
wherein the switch contactor contacts the first switch or the second switch in accordance with a movement of the slider.

13. The display device of claim 12, further comprising a driving unit providing the lead screw with a rotational force,
wherein the first and second switches regulate a driving force supplied to the driving unit.

14. The display device of claim 1, further comprising an elastic member,
wherein a side of the elastic member is fixed to the slider and another side of the elastic member is fixed to the cap,
wherein the slider includes an opening portion, and
wherein the cap is positioned in the opening portion, and the cap is provided with an elastic force upward of the slider.

15. The display device of claim 1, further comprising a base cover positioned between the top case and the slider,
wherein the base cover includes a rail on which the slider or the cap moves, wherein a groove is formed on the rail, and
wherein the cap includes:
a circle corresponding to the opening of the top case;
a bridge extended from the circle; and
a roller installed at the bridge, the roller rolling along the rail.

16. The display device of claim 15, wherein the base cover includes:

a first groove formed on the rail; and a second groove formed on the rail, the second groove at left or right from the first groove with respect to an axis of the rail, and wherein the cap includes:

a first roller installed at the bridge, the first roller corresponding to the first groove; and a second roller installed at the bridge, the second roller corresponding to the second groove.

17. The display device of claim 15, wherein the base cover includes an opening portion in which the slider moves, and wherein the opening portion of the base cover has an shape corresponding to a side of the cap in accordance with open and close of the opening.

18. The display device of claim 1, wherein the holder is formed of a leaf spring.

19. The display device of claim 18, wherein the holder surrounds a portion of the lead screw.

* * * * *